United States Patent
Matsumura et al.

(10) Patent No.: US 6,895,592 B2
(45) Date of Patent: May 17, 2005

(54) DISC CHANGER WITH IMPROVED OPERABILITY

(75) Inventors: Tomomi Matsumura, Hino (JP); Toshihiko Fujinami, Hino (JP); Yuji Motegi, Hachiouji (JP); Tetsushi Onishi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 251 days.

(21) Appl. No.: 10/223,365

(22) Filed: Aug. 20, 2002

(65) Prior Publication Data

US 2003/0039183 A1 Feb. 27, 2003

(30) Foreign Application Priority Data

Aug. 21, 2001 (JP) ........................................ 2001-250802
Aug. 21, 2001 (JP) ........................................ 2001-250824
Aug. 21, 2001 (JP) ........................................ 2001-250827

(51) Int. Cl.$^7$ .......................... G11B 17/03; G11B 17/22
(52) U.S. Cl. .................................... 720/601; 369/30.86
(58) Field of Search .......................... 369/30.86, 30.91, 369/30.32; 720/601

(56) References Cited

U.S. PATENT DOCUMENTS

| | | | | | |
|---|---|---|---|---|---|
| 4,791,626 | A | * | 12/1988 | Staar | 369/30.86 |
| 5,828,633 | A | * | 10/1998 | Inatani et al. | 369/30.86 |
| 5,892,738 | A | * | 4/1999 | Hirao et al. | 369/30.32 |
| 6,556,519 | B1 | * | 4/2003 | Shiomi | 369/30.86 |
| 6,603,715 | B1 | * | 8/2003 | Klein | 369/30.86 |
| 6,680,882 | B2 | * | 1/2004 | Ikedo et al. | 369/30.8 |

* cited by examiner

*Primary Examiner*—Allen Cao
(74) *Attorney, Agent, or Firm*—Eric J. Robinson; Robinson Intellectual Property Law Office, P.C.

(57) ABSTRACT

In a disc changer, improvements of the taking-out operation, housing operation, stabilization of disc transfer and downsizing of a conveyance mechanism and stabilization of reproducing operation are intended. The disc changer comprises a disc housing unit, a disc transfer mechanism provided on the upper surface of the disc housing unit, and a disc playback unit. The disc housing unit 100 is provided with disc exchange support mechanism for pushing up a disc inside disc housing groove 101 formed in the disc housing unit and light-emitting means 107 for allowing groove 101 to be recognized.

18 Claims, 22 Drawing Sheets

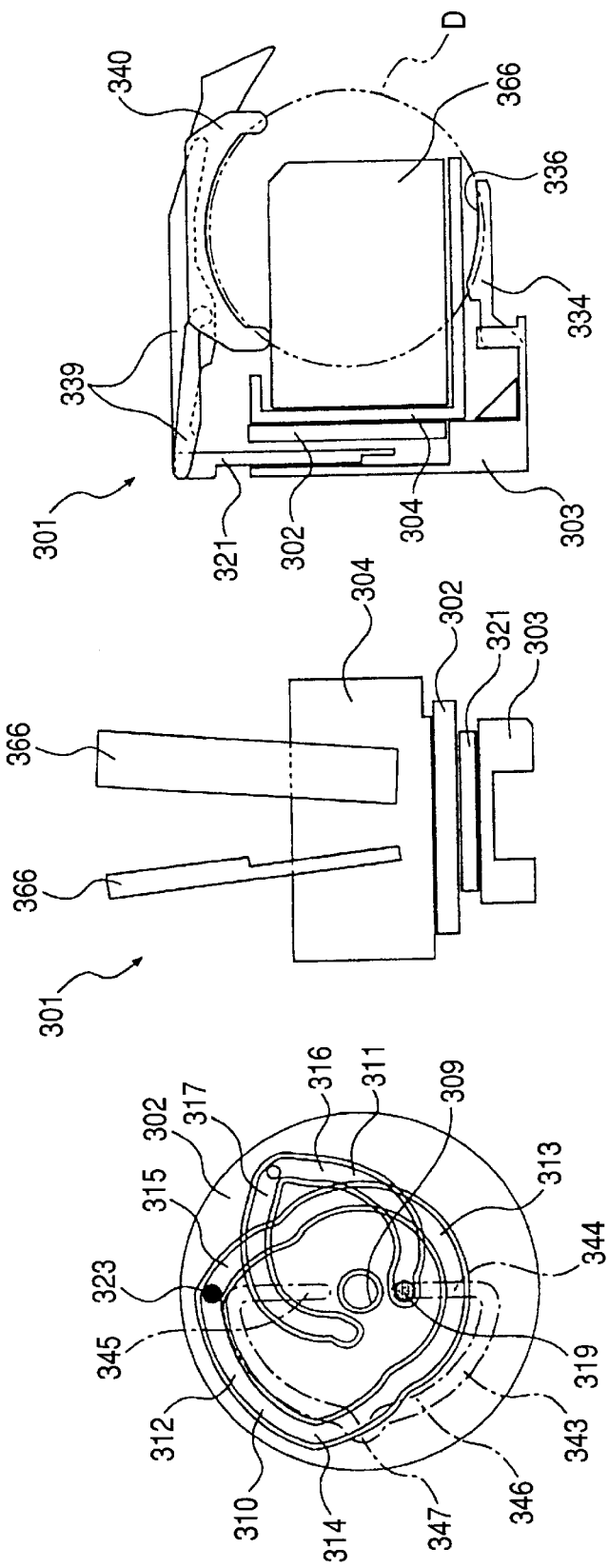

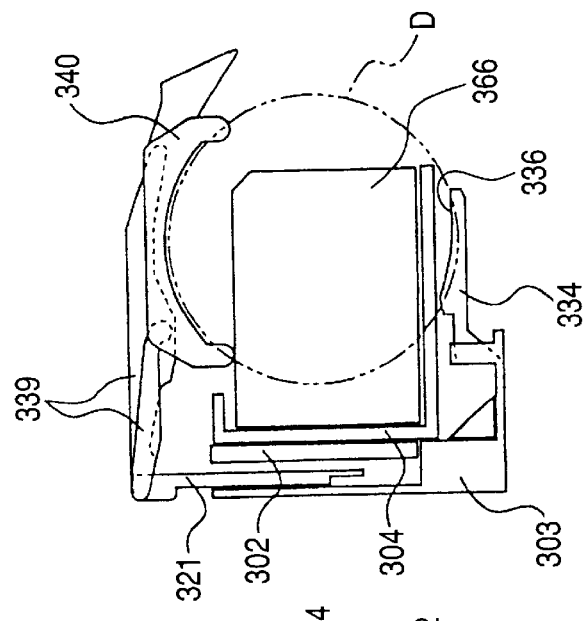
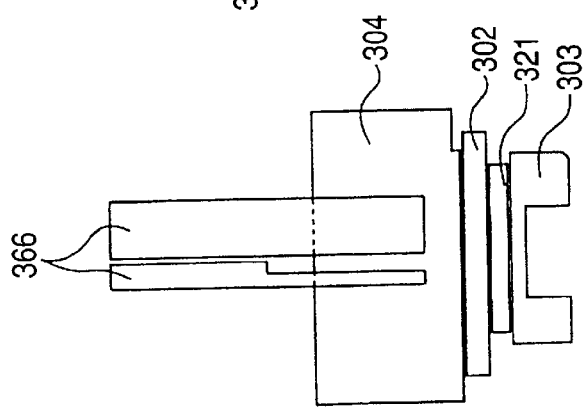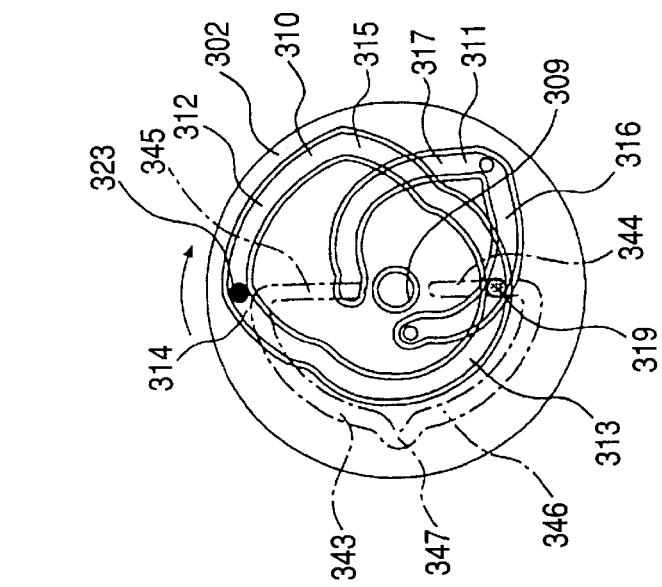

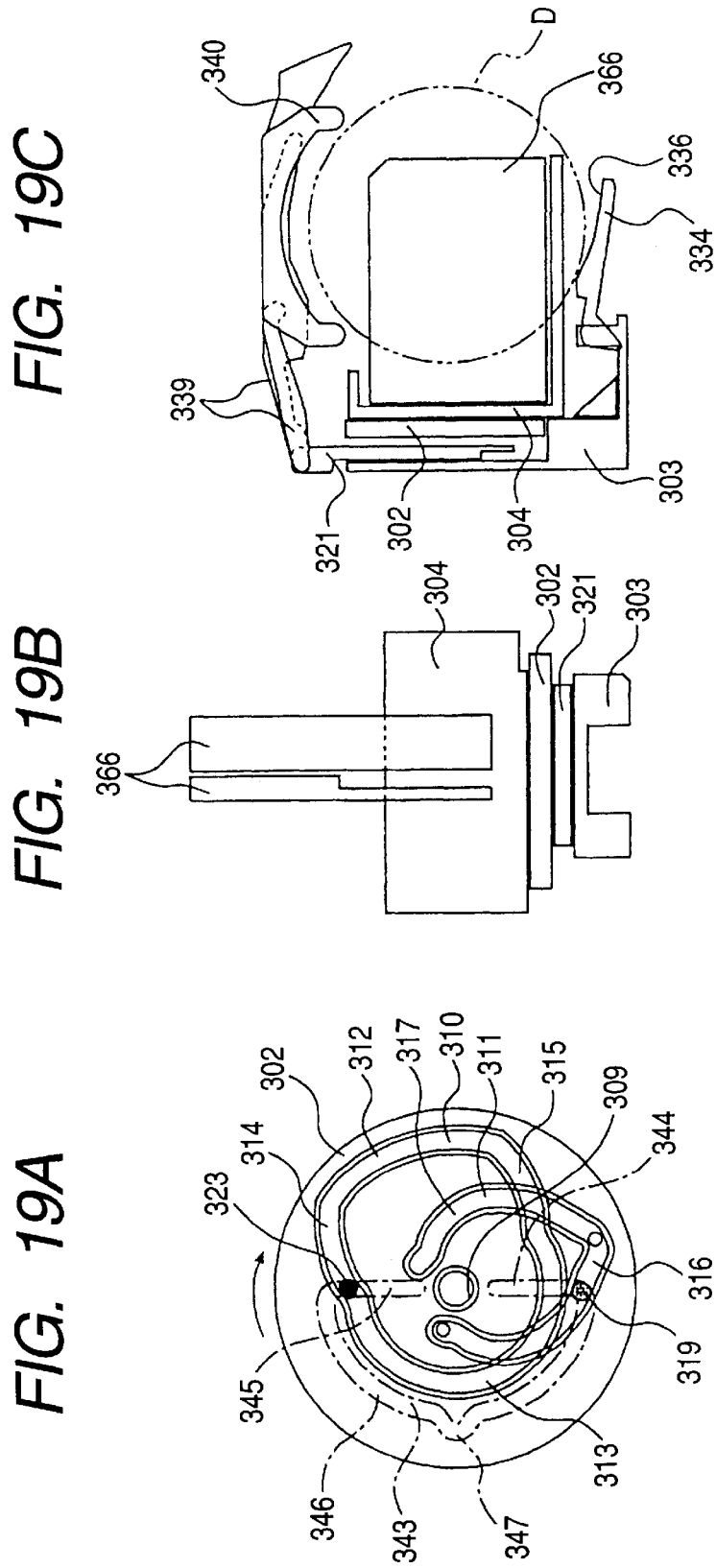

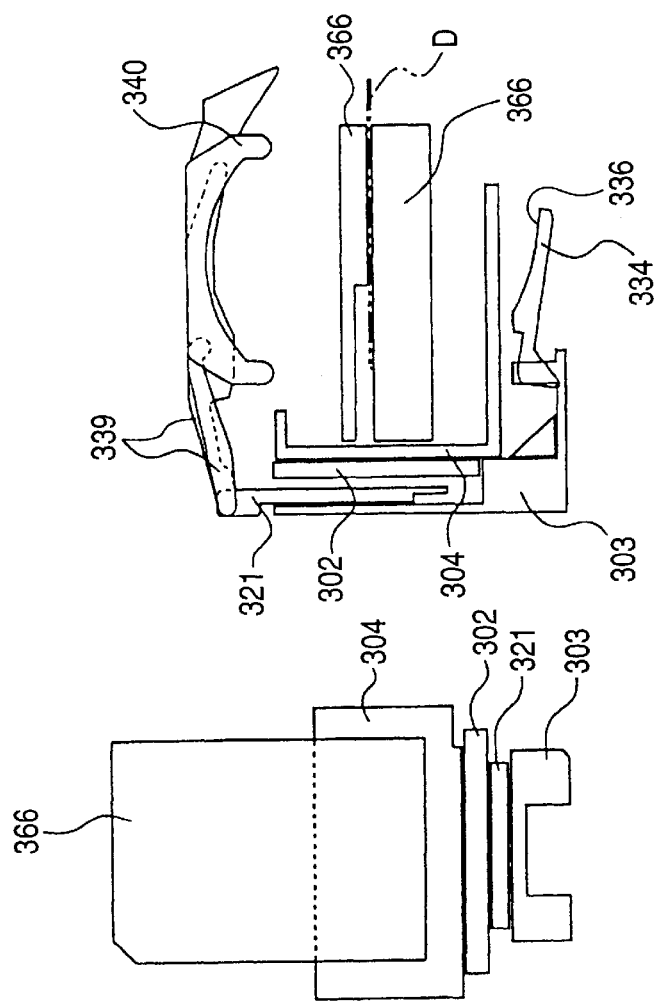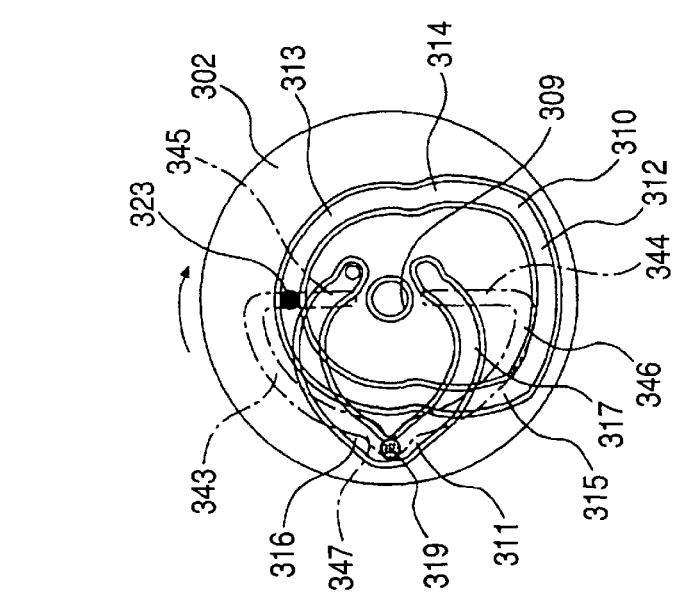

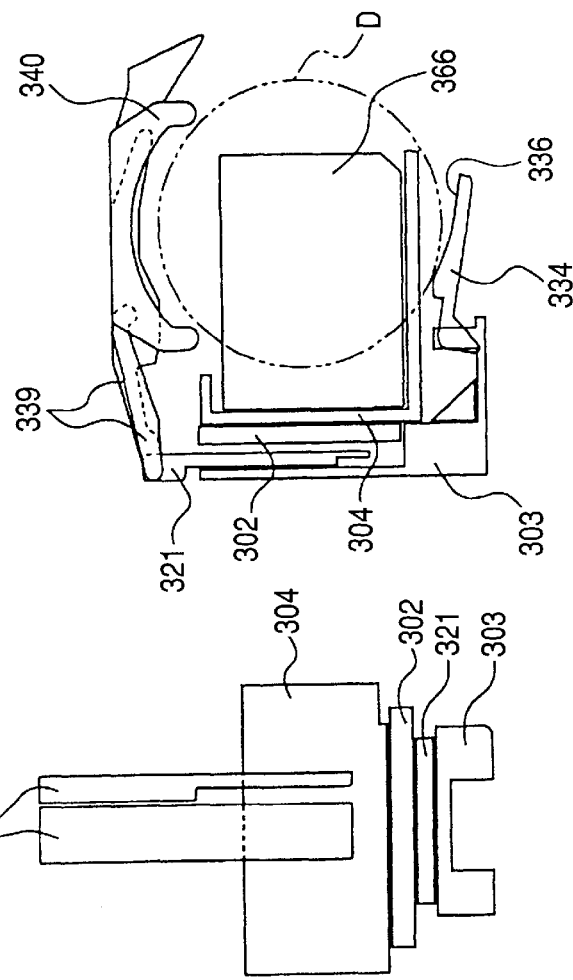

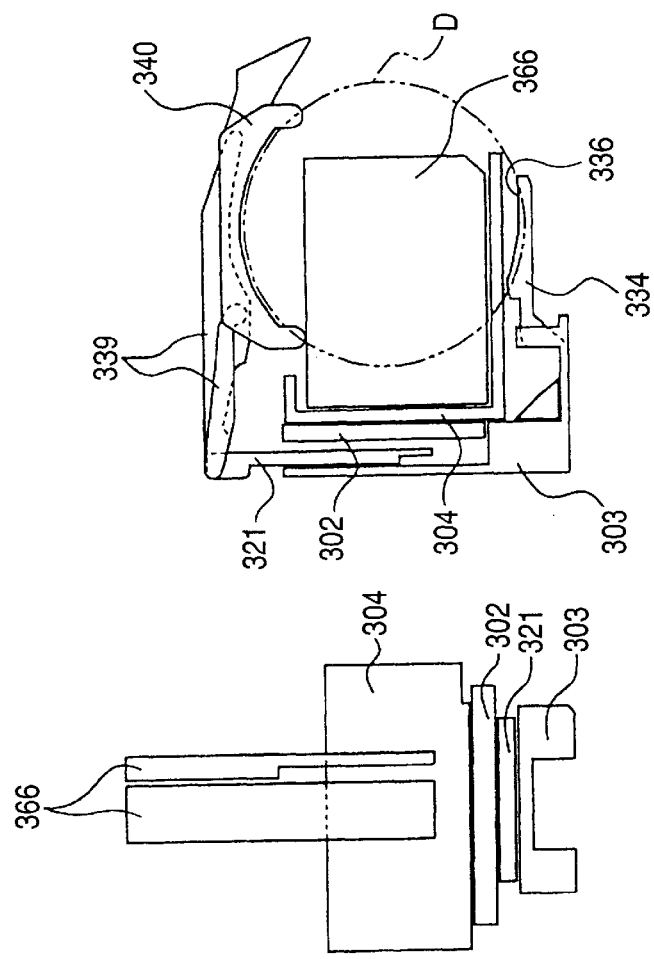

DISC CHANGER WITH IMPROVED OPERABILITY

BACKGROUND OF THE INVENTION

1. Field of the Invention

The present invention relates to a disc changer, and in particular, to improvement of a disc housing portion, a disc conveyance mechanism and a playback portion and a reproducing method of an information recording medium in the disc changer.

2. Description of the Related Art

Heretofore in the past, the disc changer which houses and reproduces various kinds of disc type information recording medium (hereinafter, referred to simply as "disc") such as CD (Compact Disc), DVD (Digital Versatile Disc) and the like has been put to practical use. This disc changer comprises a housing portion for housing a plurality of discs, a conveyance mechanism for conveying the housed disc to the playback portion and a playback portion for reproducing the disc conveyed to the playback portion.

As for the disc housing portion as described above, in recent years, as shown in FIG. 1, there has been known a disc housing portion, wherein a disc-shaped rotary type housing portion (hereinafter, referred to as "rotary stocker") 100 is provided, where a housing groove (hereinafter, referred to as "slot") 101 for housing one piece of the disk in an upstanding state is provided radially in plural pieces, and one disc is selected from among all the discs housed in the rotary stocker and is reproduced. Note that, in FIG. 1, reference numeral 200 denotes a conveyance mechanism of the disc, and reference numeral 300 or 500 denotes a playback portion.

Examples of the prior arts of the housing portion, the conveyance mechanism and the playback portion in the disc changer comprising such a rotary stocker have been as follows.

First, in the disc housing portion, when the disc housed in the slot 101 of the rotary stocker 100 as shown in FIG. 1 is to be taken out, the number of the slot (hereinafter, referred to as "designated takeout slot") in which a desired disc is housed was inputted by a numeric keypad and the like, and a microcomputer (not shown) controlled a stocker-driving portion based on this input signal so as to rotate the rotary stocker 100, and moved the designated takeout slot nearly to a center (disc exchange position)of a disc inserting and takeout opening portion 10.

Next, though the conveyance mechanism of the disc is a mechanism for conveying the selected disc to a predetermined place, in the case of the disc changer having a function for reproducing both sides, the disc is transferred from a disc housing position to a transfer position opposed 180 degrees across a long stroke.

For example, Japanese Patent Application Laid-Open No. 11-219559 discloses a structure for transferring the disc by an arm rotatably provided. This, as shown in FIG. 13A, constitutes an arm 401 in which a plurality of members are rotatably linked around a horizontal axis, and a base end portion 403 of a lower part arm 402 is rotatably provided on the upper surface of a base 404, thereby constituting a conveyance mechanism 400.

As shown in FIG. 13A, when the arm 401 is rotated, the outer periphery of a disc D is held by an engaging portion 405 of the arm 401, and this disc D is taken out from the housing position on the holder 406, while being laterally rotated. When the arm 401 is further rotated, as shown in FIG. 13B, the disc D held by the arm 401 is transferred to a playback portion 407, which is located nearly in the center portion of a holder 406. By further rotating this arm 401, the disc is transferred from the housing position of the holder 406 to the transfer position not shown, which is opposed 180 degrees.

The prior art in the playback portion of the disc is as follows. That is, in said rotary stocker, each disc is housed in an upstanding state, and the disc selected by the conveyance mechanism is conveyed to the playback portion in a nearly vertical state. The disc conveyed to the playback portion has been reproduced in the playback portion in a nearly vertical state.

In the above-described disc changer, there existed the following problems in each prior art of the disc housing portion, the conveyance mechanism and the playback portion.

That is, as shown in FIG. 1, the disc exchange opening portion 10 in the disc housing portion has a width to simultaneously expose plural pieces of discs by taking into consideration easiness of disc exchange. Accordingly, from this opening portion 10, not only the disc housed in the designated takeout slot, but also the disc housed in the slot in the vicinity of the designated takeout slot are exposed together. As a result, at the first glance, it was difficult to judge which is the disc housed in the designated takeout slot, thereby causing a trouble in taking out the disc.

Further, in the case where the disc is housed in a slot adjacent to the designated takeout slot, this disc housed in the adjacent slot acted as a hindrance and made it very difficult to take out the disc from the designated takeout slot.

On the other hand, when the disc is housed in the desired slot, the slot in which the disc is desired to be housed was moved nearly to a center (disc exchange position) of the opening portion 10 by the above-described procedure. In this case also, since not only the designated housing slot, but also the slot in the vicinity of the designated housing slot are exposed together from the opening portion 10, at the first sight, it was very difficult to judge which is the designated housing slot. As a result, it was necessary to go through a troublesome procedure wherein, after the number of the designated housing slot is visually confirmed, the disc is housed.

Hence, a first object of the present invention is to facilitate a takeout operation of the disc from the desired slot and a housing operation of the disc into the desired slot in the disc changer so that operability is exceptionally enhanced.

Next, the disc conveyance mechanism 400 described relative to FIG. 13A and FIG. 13B has involved the following problem. That is, the base 404 provided in a base end portion of the arm 401 requires a space for a lower part arm 401, which advances upward from the upper surface of the base 404. For this reason, a stroke to transfer the disc D becomes longer by that much. Further, the arm 401 is provided in such a manner as to cover the disc D from the upper surface of the base 404 to the upper part. For this reason, in order to transfer the disc D, the arm 401 rotates on a large scale on the base 404 with the base end portion 402 as a center, so that a large space is required for this purpose. Owing to these reasons, downsizing of the mechanism has been difficult to attempt.

Hence, a second object of the present invention is to attempt a steady transfer of the disc and downsizing of the mechanism in the disc conveyance mechanism of the disc changer.

Further, since the play back portion in the disc changer reproduces the disc in a nearly vertical state, an object lens and the like of a pick-up in the playback portion are applied with a load by a dead weight, and a motor shaft which rotates the disc is applied with a load by the dead weight of the disc and the motor shaft so as to reduce rotational accuracy, thereby causing a problem that the disc cannot be reproduced in a steady state.

Hence, a third object of the present invention is to provide a disc changer capable of reproducing the disc in a steady state and a reproducing method of information recording medium.

SUMMARY OF THE INVENTION

Means for solving the first object of the present invention is the invention described in claims 1 and 2, each of which has the following characteristic.

The invention according to claim 1 comprises: a playback portion for reproducing the information recorded in the disc; a disc-shaped housing portion rotatably arranged around the playback portion; a housing groove provided radially in plural pieces on the housing portion to house one piece of the disc in an upstanding state; a disc exchange opening portion; an input portion for designating a desired housing groove; and moving means for transferring a designated housing groove to a predetermined disc exchange position of the opening portion, wherein the invention comprises means for pushing-up the disc inside the housing groove placed in the disc exchange position and light-emitting means for allowing the housing groove placed in the disc exchange position to be recognized.

Further, the invention according to claim 2 in the disc changer according to claim 1, wherein the disc exchange support mechanism comprises:

a linear through-hole provided in each housing groove;

a disc pushing-up portion arranged in the disc exchange position having a protruding portion made of a translucent material capable of protruding upward from downward of the linear through-hole and a rotary portion integrally attached to said protruding portion and rotating with a rotary axis as a center; and light-emitting means for allowing said housing groove positioned at said disc exchange position to be recognized.

Next, means for solving the second object of the present invention is the invention described in claims 3 to 10, each of which has the following characteristic.

The invention according to claim 3 is a disc conveyance mechanism in which the disc is transferred from the housing position of the housing portion, where a plurality of discs are housed, to a transfer position of the housing portion via the playback portion which reproduces the disc, wherein the invention comprises:

an endless belt rotatably driven;

a carriage fixed to the endless belt;

a carrier engaged with the upper part of the disc and transferring the disc by moving with the carriage; and a housing body housing the endless belt, the carriage and the carrier, wherein a rib protruding laterally is formed on the carriage, and a guide groove for guiding the rib is formed in the inner surface of the body.

The invention according to claim 4 in the disc changer according to claim 3, wherein both side surfaces of the carriage comprise the disc conveyance mechanism which abuts against the inner surface of the housing body.

The invention according to claim 5 in the disc changer according to claim 3 or 4, wherein an opening portion is provided in the sidewall of the housing body, and a switch is provided by protruding from the opening to the inward of the housing body, and wherein the carriage moving on the inner surface of the housing body comprises the conveyance mechanism of the disc, which, by pressing against the switch, detects the position of the disc transferred to the carrier.

The invention according to claim 6 in the disc changer according to claim 5, wherein the opening portion is provided in the guide groove, and the switch is provided by protruding from the opening portion to the inward of the housing body, wherein the invention comprises the disc conveyance mechanism, in which the rib of the carriage moving along the guide groove presses against the switch so that the position of the disc to be transferred to the carrier is detected.

The invention according to claim 7 in the disc changer according to anyone of claims 3 to 6, wherein the disc conveyance mechanism comprises an arm rotatably connected to the carrier and having a pin laterally protruding and a cum groove formed in the inner surface of the housing body, and wherein the invention comprises the disc conveyance mechanism, which is constituted in such a manner that the pin of the arm is guided by the cum groove so that an attitude of the carrier changes and the disc is engaged and, in that engaged state, the disc is transferred.

The invention according to claim 8 in the disc changer according to claim 7, wherein the cam groove comprises the disc conveyance mechanism comprising a refuge portion for separating the carrier from the disc transferred to the playback portion.

The invention according to claim 9 in the disc changer according to any one of claims 3 to 8, wherein the invention comprises the disc conveyance mechanism, wherein a hole is formed on the side surface of the carrier, wherein the mechanism comprises a positioning member having a protrusion to engage with the hole, and wherein the hole of the carrier which transfers the disc to the playback portion is allowed to engage with the protrusion of the positioning member.

Further, means for solving a third object of the present invention is the invention described in claims 11 to 19, each of which has the following characteristic.

In order to achieve the above-described object, the invention according to claim 10 is a reproducing method of the disc in the disc changer including the steps of: housing a plurality of discs in the circularly formed housing portion in an upstanding state; conveying the disc selected from among all the discs housed in the housing portion to the disc gripper by the disc conveyance mechanism in a nearly vertical state; and reproducing the disc held by the disc gripper at the playback portion, wherein the disc held by the disc gripper is rotated in such a manner as to become nearly horizontal, and wherein the disc is reproduced at the playback portion in a nearly horizontal state.

The invention described in claim 11 is a reproducing method of the disc in the disc changer including the steps of: housing a plurality of discs in the circularly formed housing portion in an upstanding state; conveying the disc selected from among all the discs housed in the housing portion to the disc gripper by the disc conveyance mechanism in a near vertical state; and reproducing the disc held by the disc gripper at the playback portion, wherein the disc held by the disc gripper is rotated so as to be in a reversed state, wherein the disc is conveyed to the housing portion by the disc conveyance mechanism in a reversed state, wherein the disc is conveyed to the disc gripper by the disc conveyance mechanism in a reversed state, wherein the disc held by the disc gripper in a reversed state is rotated so as to be nearly horizontal, and wherein the disc is reproduced nearly horizontal at the playback portion.

The invention described in claim 12 is a disc changer comprising: the housing portion for housing a plurality of discs in an upstanding state, which is circularly formed; the disc conveyance mechanism for conveying the disc selected from among all the discs housed in the housing portion to the disc gripper in a nearly vertical state; and the playback portion for reproducing the disc gripped by the disc gripper, wherein the disc gripper has a pair of oscillatory gripping portions for gripping the disc in a nearly vertical state and a driving portion for driving the each gripping portion, wherein the disc gripper comprises a rotary mechanism for rotating the each gripping portion by the drive of the driving portion in a state of each gripping portion to grip the disc, and, wherein the playback portion is constituted in such a manner as to reproduce the disc rotated together with each gripping portion by the rotary mechanism in a nearly horizontal state.

The invention described in claim 13 in the disc changer according to claim 12, wherein the disc conveyance mechanism is capable of conveying the disc from the disc gripper to the housing portion, wherein the rotary mechanism is constituted in such a manner that each gripping portion is nearly reversed in a state of each gripping portion gripping the disc.

The invention described in claim 14 in the disc changer according to claim 12 or 13, wherein each gripping portion is provided in a rotatable rotary portion, wherein the rotary mechanism has a driving motor and a rotary gear rotated by the drive of the driving motor, wherein the rotary mechanism has a rotary guide groove formed in the rotary gear and a rotary moving member movably provided in the rotary portion in which a rotary boss to engage with the rotary guide groove is formed, and wherein, when the rotary boss is positioned in a predetermined section of the rotary guide groove, the rotary gear is constituted in such a manner that the rotary portion is rotated together with the rotary gear.

The invention described in claim 15 in the disc changer according to claim 14, wherein an oscillation mechanism for oscillating each of the gripping portion by the moving of the rotary moving member is provided.

The invention described in claim 16 in the disc changer according to any one of claims 12 to 15, wherein the disc gripper has a holding portion for holding the outer periphery of the disc conveyed by the disc conveyance mechanism, and wherein a holding mechanism for performing the holding and release of the holding of the disc is provided by driving the driving portion.

The invention described in claim 17 in the disc changer according to claim 16, wherein the holding mechanism has a guide groove for holding formed in the rotary gear and a moving member for holding in which a boss for holding for engaging with the guide groove for holding is formed and which is connected to the holding portion, wherein the holding portion is constituted in such a manner as to perform the holding and release of the holding of the disc by the movement of the moving member for holding.

The invention described in claim 18 in the disc changer according to claim 17, wherein, when the rotary gear rotates in a predetermined direction, the disc is gripped by each gripping portion in a state of the disc being held by the holding portion, wherein the holding of the disc is released in a state of the disc being gripped by each gripping portion so as to rotate each gripping portion, wherein the disc is held by the holding portion in a state of the disc being in a reversed state, and wherein the rotary guide groove of the rotary gear and the guide groove for holding are formed so that the gripping of the disc by each gripping portion is released in a state of the reversed disc being held.

BRIEF DESCRIPTION OF THE DRAWINGS

FIG. 3 is a view explaining the disc exchange support mechanism of the disc changer according to the present embodiment, and is a view in which FIG. 2 is looked from the above;

FIG. 7A is a view showing a state of the upper and lower positions of the carriage 203 being controlled by a guide groove 212, and FIG. 7B is a view showing a state in which the carriage 203 abuts against an inner surface of a sub-chassis 201 so that the left and right positions of the carriage 203 are controlled;

FIG. 13A is a view showing a state in which the disc is housed in a holder 406, and FIG. 13B is a view showing a state in which the disc was transferred to a playback portion 407;

FIG. 17A, FIG. 17B, and FIG. 17C are explanatory views of the disc gripper showing a state of information recording medium being held by a holding portion, and a state of the information recording medium being not held by a gripping portion. FIG. 17A shows a state of a rotary gear 6, FIG. 17B shows a schematic plan of a storage medium gripper, and FIG. 17C shows a schematic side view of the storage medium gripper;

FIG. 18A, FIG. 18B, and FIG. 18C are explanatory views of the disc gripper 301 showing a state of the disc being held by a holding portion 336 and the disc is being griped by the gripping portion 366. FIG. 18A shows a state of a rotary gear 302, FIG. 18B shows a schematic plan of the disc gripper, and FIG. 18C shows a schematic side view of the disc gripper;

FIG. 19A, FIG. 19B, and FIG. 19C are explanatory view of the disc gripper 301 showing a state of the disc being not held by the holding portion 336 and a state of the disc being gripped by the gripping portion 366. FIG. 19A shows a state of the rotary gear 302, FIG. 19B shows a schematic plan of the disc gripper and FIG. 19C shows a schematic side view of the disc gripper;

FIG. 20A, FIG. 20B, and FIG. 20C are explanatory views of the disc gripper 301 showing a state of the disc being rotated together with the gripping portion 366. FIG. 20A shows a state of the rotary gear 302, FIG. 20B shows a schematic plan of the disc gripper and FIG. 20C shows a schematic side view of the disc gripper;

FIG. 21A, FIG. 21B, and FIG. 21C are explanatory views of the disc gripper 301 showing a state of the disc being rotated in reverse together with the gripping portion 366. FIG. 21A shows a state of the rotary gear 302, FIG. 21B shows a schematic plan of the disc gripper and FIG. 21C shows a schematic side view of the disc gripper;

FIG. 22A, FIG. 22B, and FIG. 22C are explanatory views of the disc gripper 301 showing a state of the disc being rotated in reverse together with the gripping portion 366 and a state of the disc being held by the holding portion 336. FIG. 22A shows a state of the rotary gear 302, FIG. 22B shows a schematic plan of the disc gripper and FIG. 22C shows a schematic side view of the disc gripper; FIG. 23A shows a state of the rotary gear 302, FIG. 23B shows a schematic plan of the disc gripper and FIG. 23C shows a schematic side view of the disc gripper.

DETAILED DESCRIPTION OF THE PREFERRED EMBODIMENTS

Hereinafter, a disc housing portion, a conveyance mechanism and a playback portion of a disc changer according to the present invention and a reproducing method of an information recording medium will be described in detail with reference to the drawings.

Figure 1:
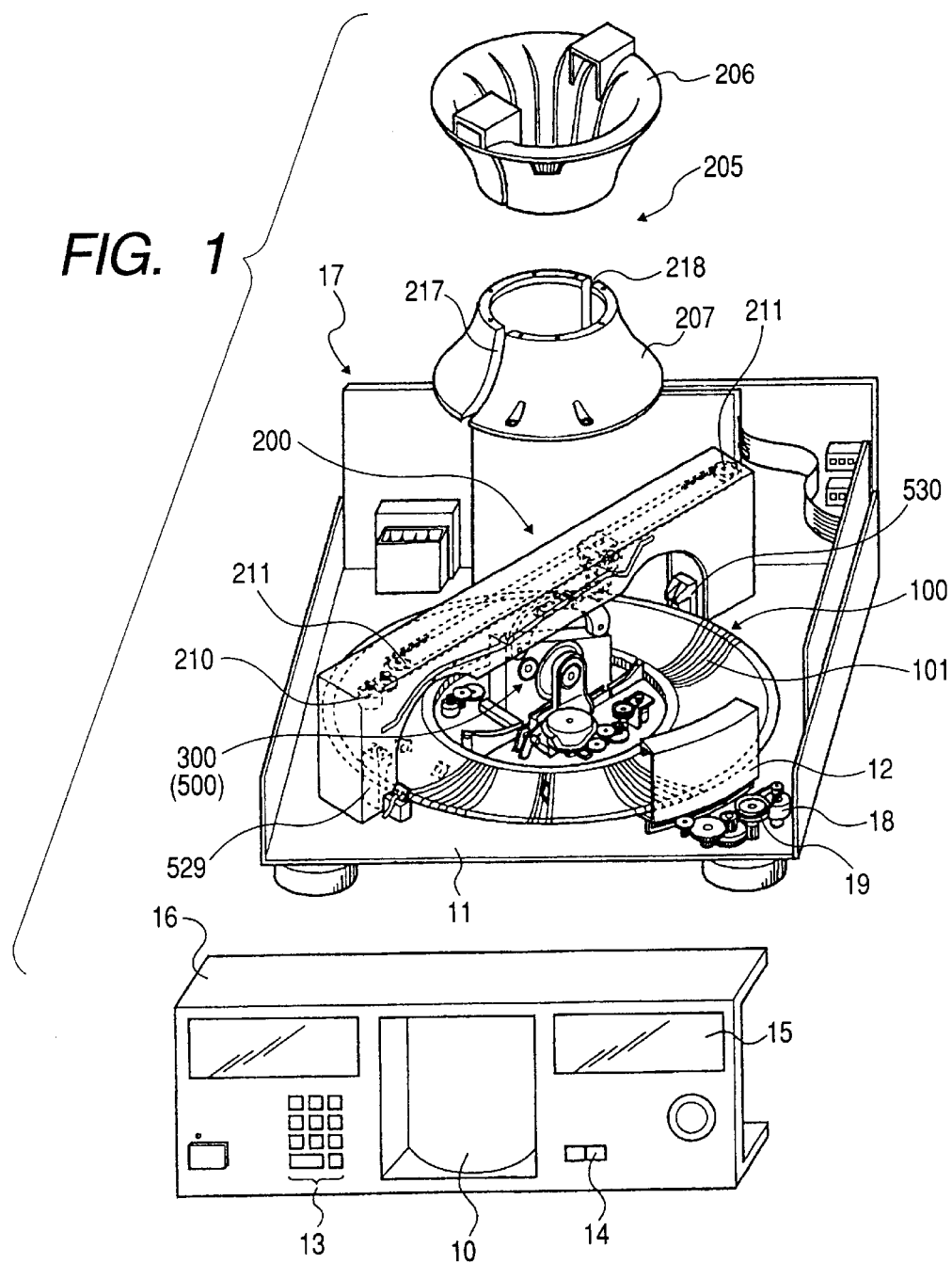
FIG. 1 is a schematic perspective view explaining an outline of a constitution of a disc changer according to an embodiment of the present invention.

Prior to the description of each of the above-described portions, first, an outline of a constitution of the disc changer of the present embodiment will be described. As shown in FIG. 1, the disc changer according to the present embodiment has an internal structure comprising: a substrate 11; a playback portion 300 (or 500) for reproducing a disc; a rotary stocker 100 having a slot 101; and a door portion 12 for opening and closing a disc exchange opening portion 10 to be described later.

Further, though not shown in FIG. 1, the disc changer according to the present embodiment is provided with a disc exchange support mechanism for supporting a takeout operation of the disc from a slot 101 and a disc housing operation to the slot 101 in addition to driving mechanisms for driving each of the above-described components and a microcomputer for controlling each driving mechanism. As for the disc exchange mechanism, it will be described later in detail.

A front surface of the internal structure is mounted with a front surface panel 16, comprising: the disc exchange opening portion 10 to be opened and closed by the door portion 12; a numeric keypad 13 for inputting a desired slot number; a door switching key 14; and a display portion 15 for displaying a designated slot number, a track number of the disc during reproduction and the like.

The playback portion 300 (or 500) comprises DSP/LSI, a pick-up unit, an RF amplifier, a servo, a D/A converter and the like, all of which are not shown, and reads the information recorded on the disc conveyed from the slot 101, converts it into a predetermined signal, and sends it to an output unit.

The rotary stocker 100 is a disc-shaped housing portion capable of housing the disc. The rotary stocker 100, as shown in FIG. 1, is arranged in the periphery of the disc playback portion 300 (or 500), and on its upper surface, a housing groove (slot) 101 capable of housing one piece of the disc is radially provided in plural pieces. The rotary stocker 100 is rotatable by a stocker-driving portion, and a driving speed and the like of the stocker-driving portion are controlled by the microcomputer.

Figure 2:
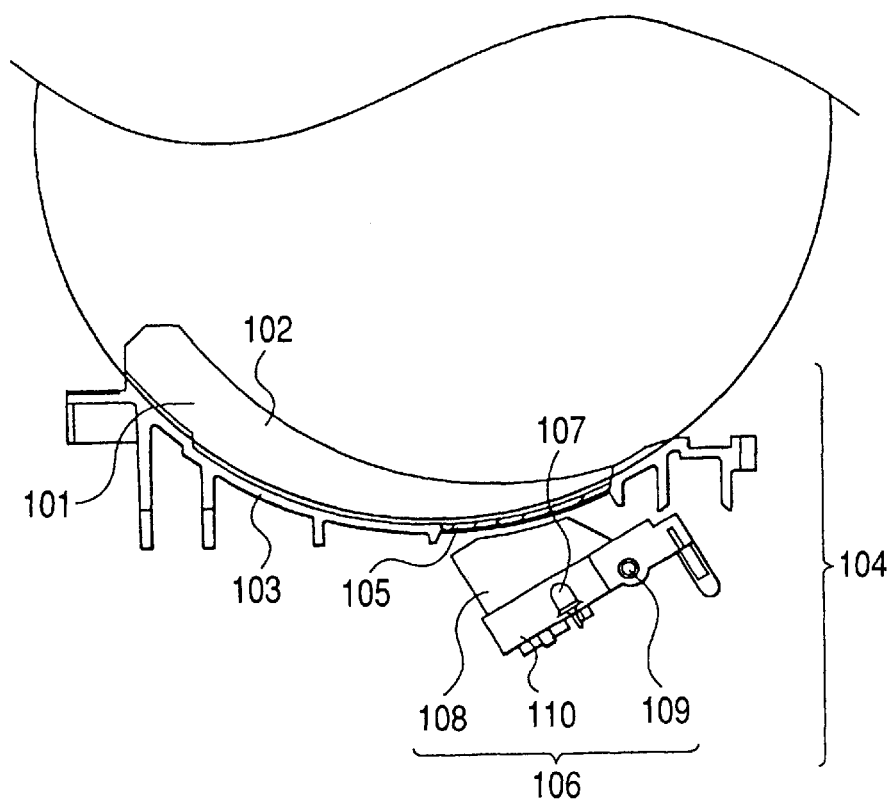
FIG. 2 is an enlarged cross-sectional view of a part of a disc housing portion explaining a disc exchange support mechanism of the disc changer according to the present embodiment.

The slot 101, as shown in FIG. 2, is arranged at an interval capable of housing one piece of the disc, and is constituted by two pieces of the sidewalls 102, whose under-edge portion is formed in the shape of a circular arc, and a narrow width bottom wall 103, which is provided between two pieces of the sidewalls 102. In the present embodiment, each slot 101 is provided with a linear through-hole (slot) 105, which constitutes a disc exchange support mechanism 104 to be described later.

The door portion 12 is openable and closable by a key inputting operation of a door switching key 14, and as described above, functions in such a manner as to open and close the disc exchange opening portion 10. When the door portion 12 is moved to a position shown in FIG. 1 and the opening portion 10 is opened, a plurality of discs are exposed so that the exchange of the disc can be performed.

The numeric keypad 13 outputs to the microcomputer by the key inputting operation a signal for designating the slot number under which the disc desired to be taken out is housed, the slot number under which the disc is desired to be housed, the slot number under which the disc desired to be reproduced is housed, the track number of the disc during reproduction and the like.

The display portion 15 comprises a display screen such as LCD (Liquid Crystal Display), and performs the display of various display information outputted from the microcomputer, for example, operating conditions of the rotary stocker 100, operation conditions of the disc during reproduction switching conditions of the door portion 12, the slot number arranged nearly at a center (disc exchange position) of the opening portion 10, the track number of the disc during reproduction and the like.

Figure 3:
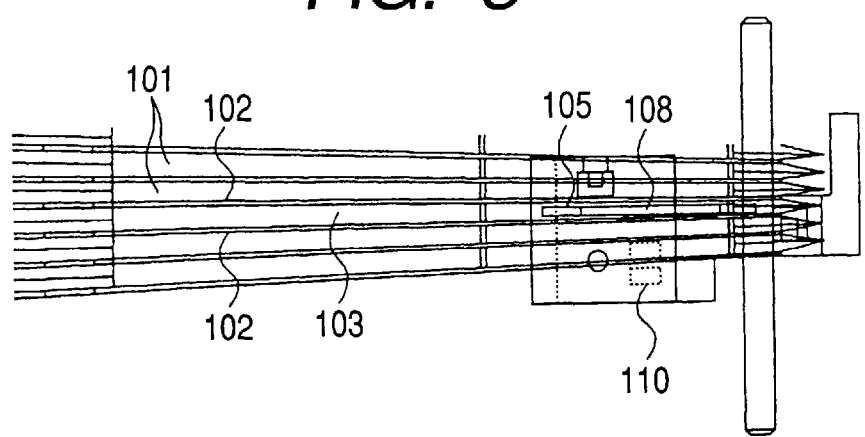

Next, by using FIGS. 2 and 3, the disc exchange support mechanism 104 will be described. The disc exchange support mechanism 104 is constituted by the linear through-hole (hereinafter, referred to as "slit") 105 provided in each slot 101, a disc pushing-up portion 106 and a light-emitting means 107, and makes it exceptionally easy to perform a takeout operation of the disc from the slot 101 and a housing operation of the disc to the slot 101.

The slit 105 is provided by allowing it to penetrate a part of the narrow width bottom wall 103 of the slot 101. The slit 105 functions in such a manner as to protrude the disc pushing-up portion 106, which will be described later, from its under part to the upper part, and allows a light emitted from the light-emitting means 107, which will be described later, pass through and turn it into a linear light beam so that the slot 101 can be easily recognized from the outside of the opening portion 10.

The disc pushing-up portion 106 is located down below the slit 105 of the rotary stocker 100, and is arranged at the disc exchange position, and performs a function of pushing slightly upward the disc housed inside the slit 105 arranged on its upper part. The disc pushing-up portion 106, as shown in FIGS. 2 and 3, is constituted by a plate-shaped protruding portion 108 which protrudes upward from downward of the slit 105 and a rotary portion 110 which is integrally attached to the protruding portion 108 and rotates with a rotary axis 109 as a center.

The protruding portion 108 performs a function of protruding upward from downward of the slit 105 so that the disc housed in the slot 101 is slightly pushed up, thereby making the takeout operation of the disc easy. Further, this protruding portion 108 is made of a translucent material (polypropylene), and allows a light emitted from the light-emitting means 107, to be described later, to penetrate into the slit 105 side so that the linear light beam is discharged to the outside and a predetermined position of the slot 101 is made easily recognizable from the outside of the opening portion 10.

The rotary portion 110 rotates with the rotary axis 109 as a center, and functions so as to protrude the protruding portion 108 upward from downward of the slit 105. The rotary portion 110 is rotatable by a rotary driving portion not shown, and the microcomputer controls a rotary timing of this rotary driving portion, a rotary speed and the like.

The light-emitting means 107 functions so as to emit a visible light such as a red light, a green light and the like. The visible light emitted from this light-emitting means 107 penetrates the protruding portion 108 made of the translucent material, and further passes through the slit 105 so as to be turned into the linear light beam. For this reason, it is possible to recognize a predetermined slot 101 from the outside of the opening portion 10. In the present embodiment, as the light-emitting means 107, a red LED of a Ga—As type is used, and a light emitting timing of this red LED is controlled by the microcomputer.

Subsequently, operations when the disc housed in the slot 101 of the rotary stocker 100 of the disc changer according to the present embodiment is taken out and the disc is housed into the slot 101 will be described.

(1) In Case of Taking Out the Disc:

First, the number of the slot (designated takeout slot) 101 in which the disc desired to be taken out is housed is inputted by the numeric keypad 13, and, based on this input signal, the microcomputer controls the stocker-driving portion so as to rotate the rotary stocker 100 and move the designated takeout slot 101 nearly to a center (disc exchange position) of the opening portion. That is, the microcomputer and the stocker-driving portion are moving means.

Figure 4:
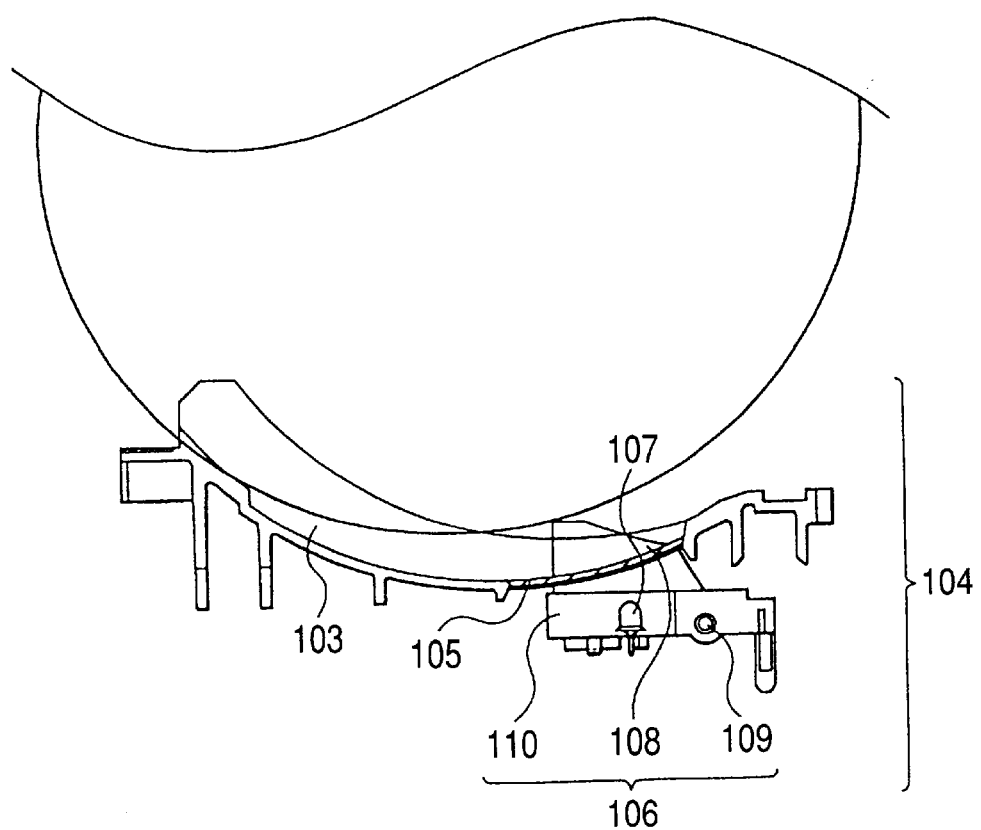
FIG. 4 is a view explaining the disc exchange support mechanism of the disc changer according to the present embodiment, and is an enlarged cross-sectional view showing a view in which a rotary portion of a disc pushing-up portion is rotated from a state of FIG. 2 so as to protrude a protrusion portion upward from a slit.

When the designated takeout slot 101 is assigned to the disc exchange position, the microcomputer automatically controls the rotary driving portion of the disc exchange support mechanism 104 so as to rotate the rotary portion 110 and protrude the protruding portion 108 to the upper part of the slit 105 (see FIG. 4), and the microcomputer allows the light-emitting means 107 to emit a light to pass through the slit 105 and discharge the linear red light beam outside, so that the designated takeout slot 101 can be easily recognized from the outside of the opening portion 10.

The disc housed in the designated takeout slot 101 is slightly pushed upward than the disc housed in other slot 101 by the protruding portion 108 of the disc exchange support mechanism 104. Further, the linear red light beam, which has emitted from the light-emitting means 107 of the disc exchange support mechanism 104 and passed through the protruding portion 108 and the slit 105, is discharged from the designated takeout slot 101. By such a disc takeout support operation of the disc exchange support mechanism 104, the disc can be easily taken out from the designated takeout slot 101.

(2) In Case of Housing the Disc:

First, the number of the slot (designated takeout slot) 101 in which the disc is desired to be housed is inputted by the numeric keypad 13, and, based on this input signal, the microcomputer controls the stocker driving portion so as to rotate the rotary stocker 100 and move a designated housing slot 101 nearly to a center (disc exchange position) of the opening portion 10.

When the designated housing slot 101 is assigned to the disc exchange position, the microcomputer automatically allows the light-emitting means 107 to emit a light to pass through the slit 105 and discharge the linear red light beams to the outside. By such a disc accommodation support operation of the disc exchange support mechanism 104, the disc can be extremely easily housed into the designated housing slot 101.

According to the disc changer of the present embodiment, since the disc changer comprises the disc exchange support mechanism 104 comprising the slit 105, the disc pushing-up portion 106, and the light-emitting means 107, and discharges the linear red light beam by the light-emitting means 107 from the slit 105 of the designated takeout slot 101 moved to the disc exchange position, the user can easily recognize the designated takeout slot 101 from the outside of the opening portion 10. Accordingly, it is exceptionally easy to discriminate the designated takeout slot 101 from other slot, as a result of which, the disc housed in the designated takeout slot 101 can be extremely easily taken out.

Further, according to the disc changer according to the present embodiment, since the disc changer comprises the disc exchange support mechanism 104 having the slit 105 and the disc pushing-up portion 106, it can protrude the disc pushing-up portion 106 upward from downward of the slit 105 and slightly push up the disc housed in the designated takeout slot 101. Accordingly, even in the case where the disc is housed in the slot adjacent to the designated takeout slot 101, the disc can be extremely easily taken out from the designated takeout slot 101.

Further, according to the disc changer according to the present embodiment, since the disc changer comprises the disc exchange support mechanism 104 comprising the slit 105, the disc pushing-up portion 106 and the light-emitting means 107 and discharges the linear red light beam from the slit 105 of the designated housing slot 101 moved to the disc exchange position, the user can easily recognize the designated housing slot 101 from the outside of the opening portion 10. Accordingly, it is exceptionally easy to discriminate the designated housing slot 101 from other slot, as a result of which, the disc can be extremely easily housed into the designated housing slot 101.

In the above described embodiment, as the translucent material of the protruding portion 108, though polypropylene was cited, it is not limited to this, but thermosetting resin such as, for example, polyethylene, vinyl chloride resin, polystyrene, methacrylate resin, polycarbonate, polyethylene terephtalate and the like can be cited.

Further, in the present embodiment, as the light-emitting means 107, though the red LED of the Ga—As type was used, it is not limited to this, but a green LED of a Ga—P type and the red LED of the Ga—P type doped with $O_2$ and $N_2$ and the like can be used.

Next, an embodiment of the disc conveyance mechanism will be described.

Figure 5:
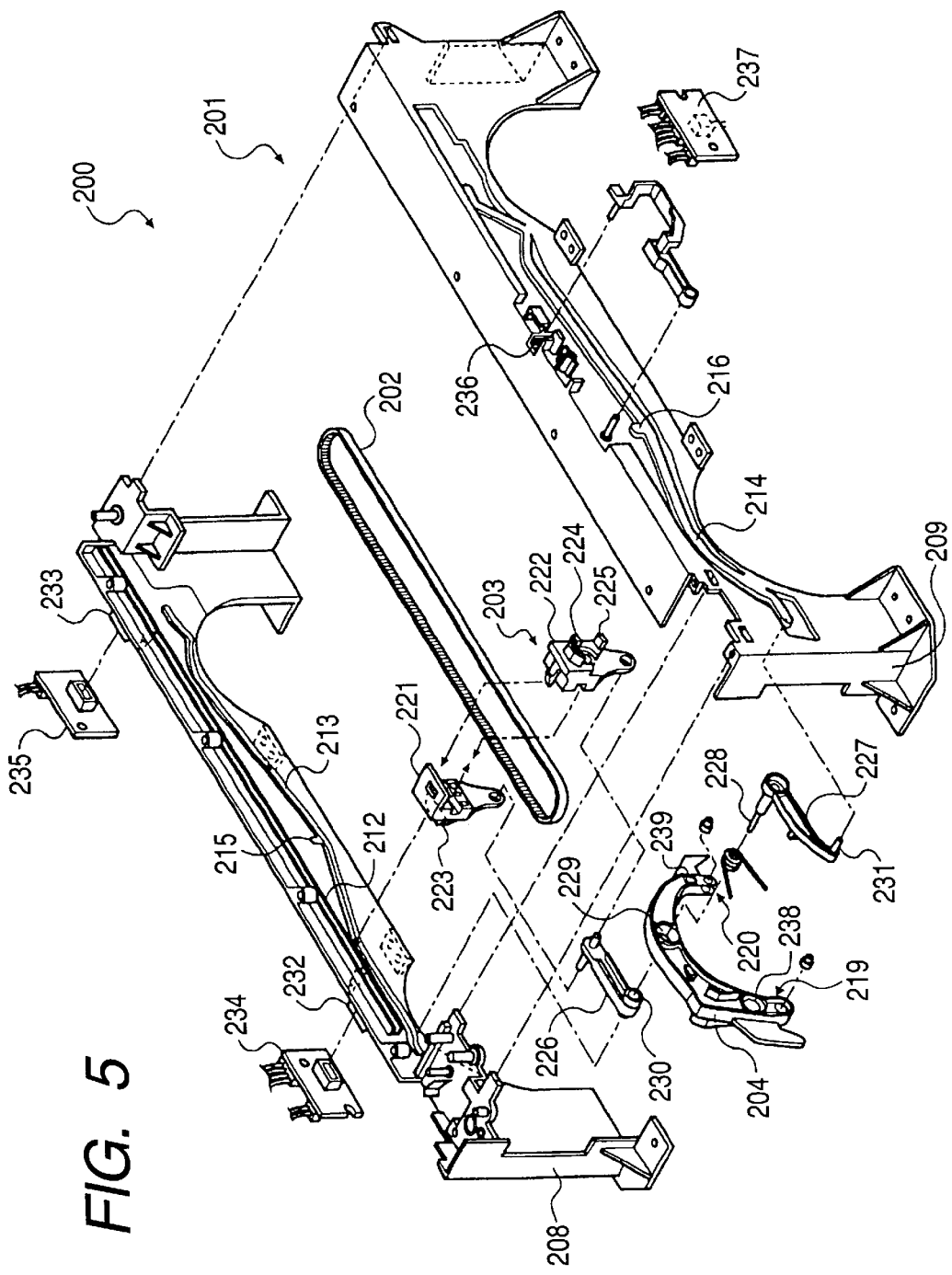
FIG. 5 is an exploded perspective view of a part of a disc conveyance mechanism 200 of the disc of FIG. 1.

As shown in FIGS. 1 and 5, the conveyance mechanism 200 comprises: a sub-chassis (housing body) 201 provided so as to stride over a rotary stocker 100; a timing belt with tooth (endless belt) 202 rotatably stretched in the inner side of the sub-chassis 201; a carriage 203 fixed to one place of the timing belt with tooth 202; a carrier 204 which transfers a disc; a disc guide 205 provided nearly in a center of the rotary stock 100.

The sub-chassis 201 is formed in the shape of an arch standing up by a pair of leg portions formed at the side of the rotary stocker 100. This arch-shaped under part is formed in the shape of a circular arc. Further, a disc guide 205 is integrally formed with an upper guide 206 extending upward and a lower guide 207 extending downward, and the side surface of the disc guide 205 is bent in the shape of the circular arc. In this way, even when the rotary stocker 100 is rotated, the disc which is housed in the rotary stocker 100 does not interfere with the sub-chassis 201 and the disc guide 205.

The sub-chassis 201, as shown in FIG. 5, comprises a left side sub-chassis 208 and a right side sub-chassis 209, and fitting portions formed thereof, respectively are mutually fitted and integrally formed by screw clamps. This sub-chassis 201 is built with a motor 210 shown in FIG. 1 and gears for transmitting a driving force of this motor 210. These gears rotate a pair of pulleys 211 which engage with both ends of the timing belt with tooth 202, as a result of which, the driving force from the motor 210 is transmitted so that the timing belt with tooth 202 is rotatably driven.

The inner surface of the left side sub-chassis 208 is provided with a guide groove 212. This guide groove 212 protrudes toward the inner side of the sub-chassis 201 integrally in a U-shaped letter, and extends nearly horizontal along a longitudinal direction of the sub-chassis 201.

Further, a cum groove 213 is formed in the inner surface of the left side sub-chassis 208. Further, a cum groove 214 is formed in the inner surface of the right side sub-chassis 209. These cum grooves 213 and 214 are formed in such a manner that two nearly circular arc portions thereof are connected, respectively, and refuge portions 215, 216 advancing upward from a region in which the two nearly circular arc portions are connected are formed, respectively.

Further, a pair of notches 217, 218 are formed in the side surface of the disc guide 205. These notches 217, 218 form a transfer path of the disc passing through the disc guide 205. This conveyance mechanism 200 is constituted in such a manner that the disc can be transferred in whichever direction advancing from the notch 217 to the other notch 218 or the other way.

The carrier 204 is configured in the shape of a semicircular arc, and on both end portions thereof, grooves 219, 220 for gripping the upper part of the disc are formed. Further, the carriage 203 is fixed to the timing belt with tooth 202, and a pair of the left side carriage 221 and the right side carriage 222 are fitted to each other by gripping the timing belt with tooth 202, and are integrally formed by screwing the center thereof.

Figure 7A:
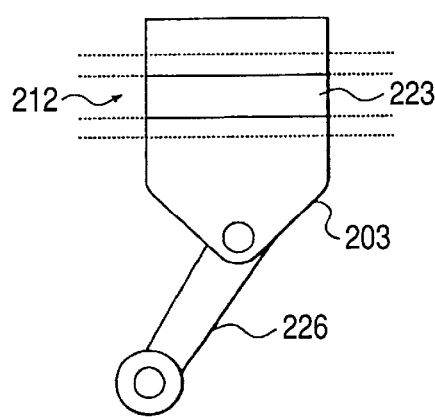
FIG. 7A, and FIG. 7B are a view explaining a state of the position of a carriage 203 shown in FIG. 5 being controlled.
Figure 7B:
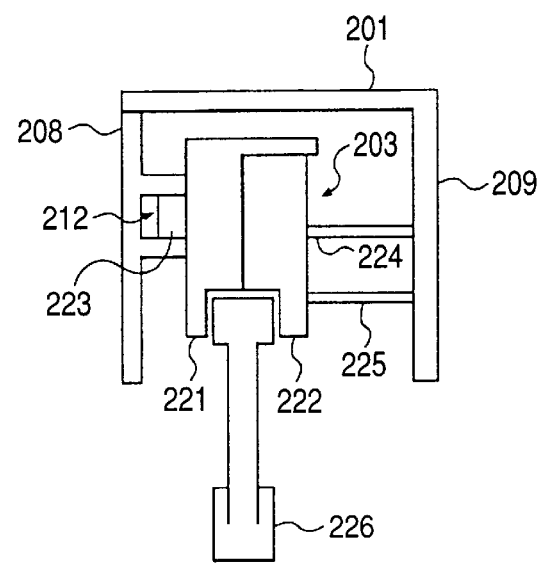

A rib 223 is formed by protruding from the side surface of this left side carriage 221. This rib 223, as shown in FIG. 7A, is designed so as to fit into a nearly U-shaped letter portion of the guide groove 212. Further, two protruding portions 224,225 are formed in the side surface of the right side carriage 222. The side surfaces of these protruding portions 224, 225, as shown in FIG. 7B, abut against the inner surface of the right side sub-chassis 209. In this way, both side surfaces of the carriage 203 are arranged to abut against the inner surface of the sub-chassis 201.

One end of an arm 226 is rotatably axially supported at a bottom end portion of this carriage 203. Further, a pin 228 protruding from one end of an arm 227 to the inner side, together with an opening portion 229 formed nearly in a center of the carrier 204, penetrate into an opening portion 230 formed on the end portion of the arm 226. The carrier 204 of this pin 228 and a portion protruded from the arm 226 are inserted into the cum groove 213 formed in the inner surface of the left side sub-chassis 208.

Further, a pin 231 protruded and provided laterally from the other end of the arm 227 is inserted into the cum groove 214 formed in the inner surface of the right side sub-chassis 209.

As a result, when the timing belt with tooth 202 is rotated, the carriage 203 is controlled in upward and downward positions by the guide groove 212, and is controlled in the left and the right positions by the inner surface of the sub-chassis 201. In this way, the carriage 203 makes a steady sliding movement without fluctuation along the longitudinal direction of the sub-chassis 201 in any direction to the near side or to the innermost side.

When the carriage 203 makes a sliding movement in this way, the carrier 204 moves by following this carriage 203. At this time, the pin 227 is guided by the cum groove 213, and the pin 231 is guided by the cum groove 214. These cum grooves 213 and 214 are designed so that the carrier 204 can trace a predetermined attitude to transfer the disc. By these cum grooves 213, 214, the carrier 204 steadily operates without fluctuation, and steadily transfers the disc.

Further, two opening portions 232, 233 are formed in the guide groove 212 of the left side sub-chassis 208. These opening portions 232, 233 are formed nearly at both ends of guide groove 212, and are attached with a start detection switch 234 and an end detection switch 235, respectively. On the other hand, an opening portion 236 is also formed in the sidewall of the right side sub-chassis 209, and to this opening portion 236, a center position detection switch 237 is fixed toward the inner side of the sub-chassis 209.

As a result, detected portions of the start detection switch 234 and the end detection switch 235 are arranged to protrude to the inward of the sub-chassis 201. Accordingly, when the carriage 203 is guided by the guide groove 212 and reaches these detected portions, the detected portion of the start detection switch 234 or the end detection switch 235 is pressed against by the rib 223 of the carriage 203 so as to output the signal.

Further, the detected portion of the center position detection switch 237 is arranged to protrude to the inward of the sub-chassis 201. Accordingly, when the carriage 203, which slides along the inner surface of the sub-chassis 201, reaches this portion, the detected portion of the center position detection switch 237 is pressed against by the protruding portions 224,225 of the carriage 203 so as to output the signal.

In this way, the carriage 203 press-operates the switch in the course of the sliding movement on the inner surface of the sub-chassis 201. Based on the output signals of these switches, the control portion grasps the conveying position of the disc.

An improved playback portion to be described later, that is, a disc playback portion which is different from the playback portion for reproducing the disc put into a horizontal state is provided nearly in the center portion of the disc guide 205.

Figure 6:
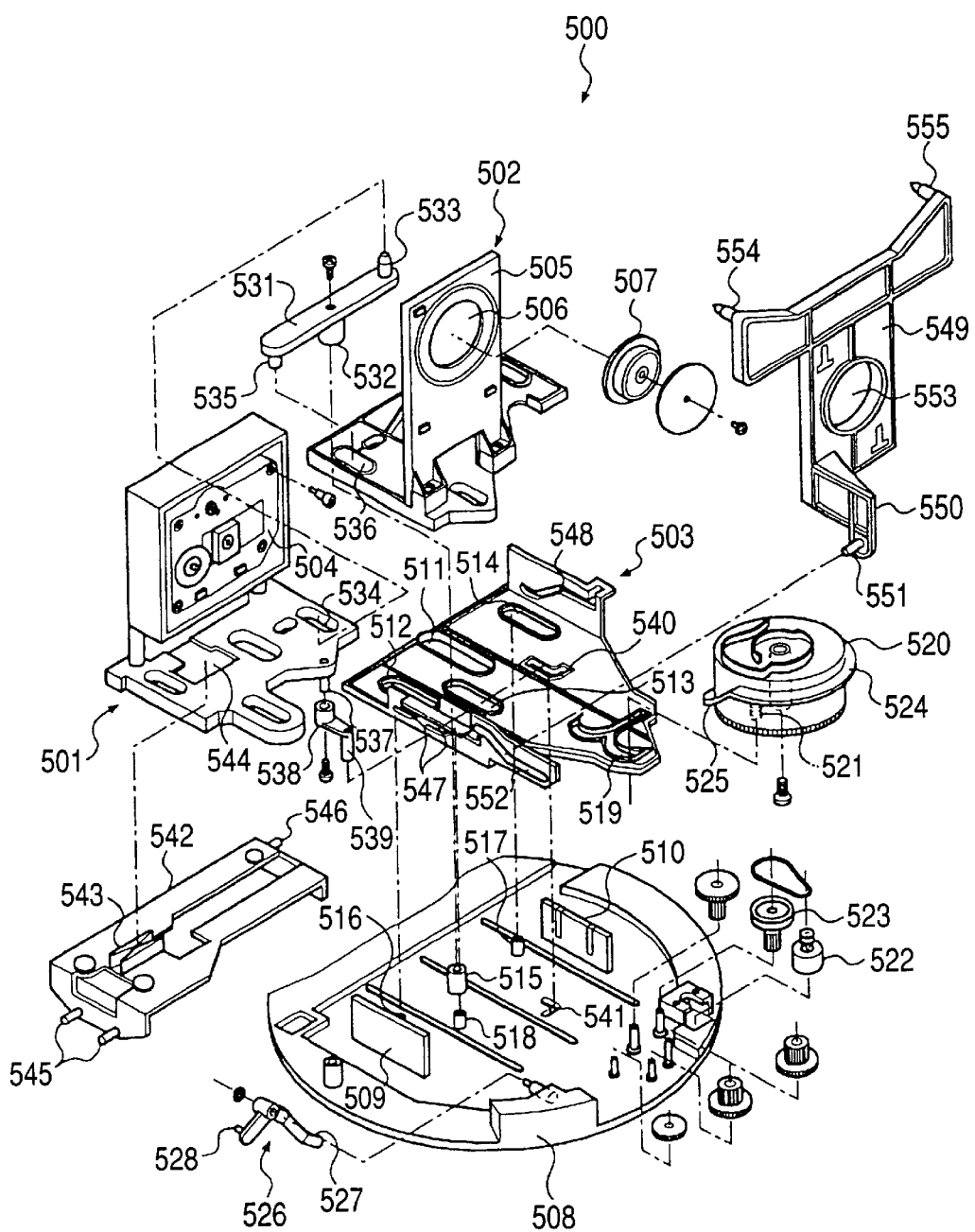
FIG. 6 is an exploded view of a part of a playback portion 500 of FIG. 1.

As shown in FIG. 6, the playback portion 500 has a TU slider 501, a clamp slider 502 and a main slider 503 mutually movably constituted, and reproduces the disc by clamping the disc between the TU slider 501 and the clamp slider 502.

A rectangular frame is vertically formed from the upper surface of the TU slider 501, and a traverse portion 504 is fixed to an inner portion of this rectangular frame at four corners by screw clamps.

The upper surface of the clamp slider 502 comprises a clamp chassis 505, and a nearly circular center hole 506 is formed on this clamp chassis 505. This center hole 506 is attached with a step tailored to the form of a clamber 507, and is fitted to a clamber 507 and fixed by screw clamps.

The main slider 503 is arranged so as to be fastened at both side surfaces by a pair of plate materials 509,510 which are formed by standing up on the chassis 508. On this main slider 503, four pieces of grooves 511, 512, 513, 514 nearly in parallel to one another are formed, and are passed through by projections 515, 516, 517, 518 formed on the chassis 508, respectively.

A nearly Y letter-shaped groove 519 is formed on the main slider 503. This groove 519 has two grooves bent in the shape of a circular arc formed symmetrically, and a linear groove is integrally connected with these circular arc-shaped grooves. A pin 521 protruding vertically from the bottom surface of a cum 520 is inserted into this groove 519. A gear formed on the peripheral surface of this cum 520 is engaged with a gear which transmits a rotation of the motor 522 via a pulley 523.

This pin 521 is arranged by shifting from a center axis of the cum 520. For this reason, when the cum 520 is rotated, the pin 521 traces a circumferential orbit, which takes a horizontally alienated length from the center axis of the cum 520 as a radius. The circular arc-shaped groove of the groove 519 is designed in such a manner as to correspond to the circumferential orbit that the pin 521 traces.

As a result, when the cum 520 is rotated, and when the pin 521 is in the circular arc-shaped groove, the pin 521 moves along this circular arc-shaped groove, and the main slider 503 does not operate. Further, when the pin 521 is in the linear groove, the main slider 503 is pushed by the pin 521 so as to make a sliding movement.

Further, the cum 520 is integrally formed with a plate material 524, which protrudes horizontally from the outer periphery thereof, and on a part thereof, a slant face 525 is formed. On the upper surface of this plate material 524, a pin 527 horizontally protruded from one end of an arm 526 rotatably provided in the chassis 508 is supported. A pin 528, which horizontally protrudes from the other end of this arm 526, is connected to a link mechanism not shown, and this link mechanism is connected to a pair of stoppers 529, 530 shown in FIG. 1.

As a result, when the cum 520 is rotated, the pin 527 of the arm 526 is pushed up or pushed down by the slant face 525, and at the same time, the arm 526 is rotated, so that the stoppers 529, 530 grip or release the rotary stocker 100 via the link mechanism not shown. This slant face 525, when the pin 528 of the arm 526 is on the slant face 525, is designed in such a manner that the pin 521 of the cum 520 moves along the circular arc shaped groove of the groove 519. In this way, as long as the stoppers 529, 530 are operating, the main slider 503 is not allowed to operate, so that commonality of a driving system for clamping the disc and the driving system of the stoppers 529, 530 is attempted.

A connecting arm 531 comprises a cylindrical fitting portion 532, which protrudes downward from the center thereof, and this fitting portion 532 passes through the groove 511 of the main slider 503, and fits into the projection 515 formed on the chassis 508. Further, a protrusion 533 protruding upward from one end of the connecting arm 531 is inserted into a groove 534 of the TU slider 501, and a protrusion 535 protruding downward from the other end of the connecting arm 531 is inserted into a groove 536 of the clamp slider 502.

As a result, the TU slider 501 and the clamp slider 502 are sliderbly connected by the connected arm 531 in a direction coming to or away from each other.

One end of a switching arm 538 is pivotably supported on a protrusion 537 of the bottom surface of the TU slider 501. A protrusion 539 protruding downward from the other end of this switching arm 538 is formed, and this protrusion 539 passes through a L type groove 540 of the main slider 503, and is inserted into a L type groove 541 formed in the chassis 508. These L type grooves 540 and 541 are formed nearly in the shape of a L-letter which slightly advances laterally in its end portion, and these L type grooves 540 and 541 face to face mutually in a opposite direction.

The upper surface of a disc guide 542 comprises a groove-shaped guide portion 543, and this guide portion 543 passes through an opening portion 544 formed in the TU slider 501, and protrudes upward of the TU slider 501. The under part of the disc transferred to the playback portion 500 in this way is supported by the groove of the guide portion 543.

Three pieces of the pins 545, 546 horizontally protrude in the side surfaces of the disc guide 542. These pins 545, 546 are inserted into escalator grooves 547, 548 formed in the side surfaces of the main slider 503.

A control slider (positioning member) 549 is formed nearly in the shape of a T letter, and a plate-shaped member 550 protrudes from the lower end portion thereof. A pin 551 protruding laterally is formed in this plate-shaped member 550, and this pin 551 is inserted into a cum groove 552 formed on the side surface of the main slider 503.

Further, a circular center hole 553 is formed in the control slider 549 at a position corresponding to clamber 507. In this way, the control slider 549 allows the center hole 553 to take the clamber 507 so as to contact a rear surface of the clamp chassis 505.

Further, a pair of protrusions 554, 555, which face the clamp chassis 505, are formed on the control slider 549. This pair of protrusions 554, 555 is formed at the position corresponding to holes 238, 239 of the carrier 204 of FIG. 5, which has transferred the disc to the playback portion 500. When these protrusions 554, 555 are instated into the holes 238, 239 of the carrier 204, the disc which has been transferred to the playback portion 500 is reliably positioned. Tops of these protrusions 554, 555 are pointed in the shape of a circular cone, and are smoothly inserted into the holes 238, 239 of the carrier 204 when the disc is positioned.

According to this disc conveyance mechanism 200, the sub-chassis 201 may be a space housing the timing belt with tooth 202 having a length of the stroke enough to transfer the disc, the carriage 203 and the carrier 204 which operate by this timing belt with tooth 202 and the like, and therefore, the sub-chassis is constituted extremely compact.

Further, in order to assemble the disc conveyance mechanism 200, it is enough to fasten the timing belt with tooth 202 by the left side sub-chassis 208 and the right side sub-chassis 209 and screw it, and therefore, assembly property thereof is extremely good.

This disc changer transfers and reproduces the disc in the following manner.

First, when a predetermined button provided in front of a chassis case 17 is press-operated, a driving force is transmitted from a motor 18 via pulley 19 and a gear so that a door portion 12 moves along the outer periphery of the rotary stocker 100. In this way, the door portion 12, which blocks the front surface of the chassis case 17, is thrown open, and the user mounts the disc on the rotary stocker 100. After that, the door portion 12 blocks the front surface of the chassis case 17.

Subsequently, by press-operating a predetermined button, a disc number desired to be reproduce is selected. Based on this disc number, the control portion rotates the rotary stocker 100 until the selected disc comes to positions of the notches 217, 218. After that, the control portion drives the stoppers 529, 530 so as to fasten the periphery portion of the rotary stocker 100, and fixes the rotary stocker 100.

On the other hand, in order to transfer the disc located at positions of the notches 217, 218, the control portion rotates the timing belt with tooth 202 and moves the carriage 203 to an initial position. At this time, the start detection switch 234 is press-operated by the rib 223 of the carriage 203. By obtaining this output signal, the control portion grasps that the carriage 203 is located at the initial position.

Figure 8:
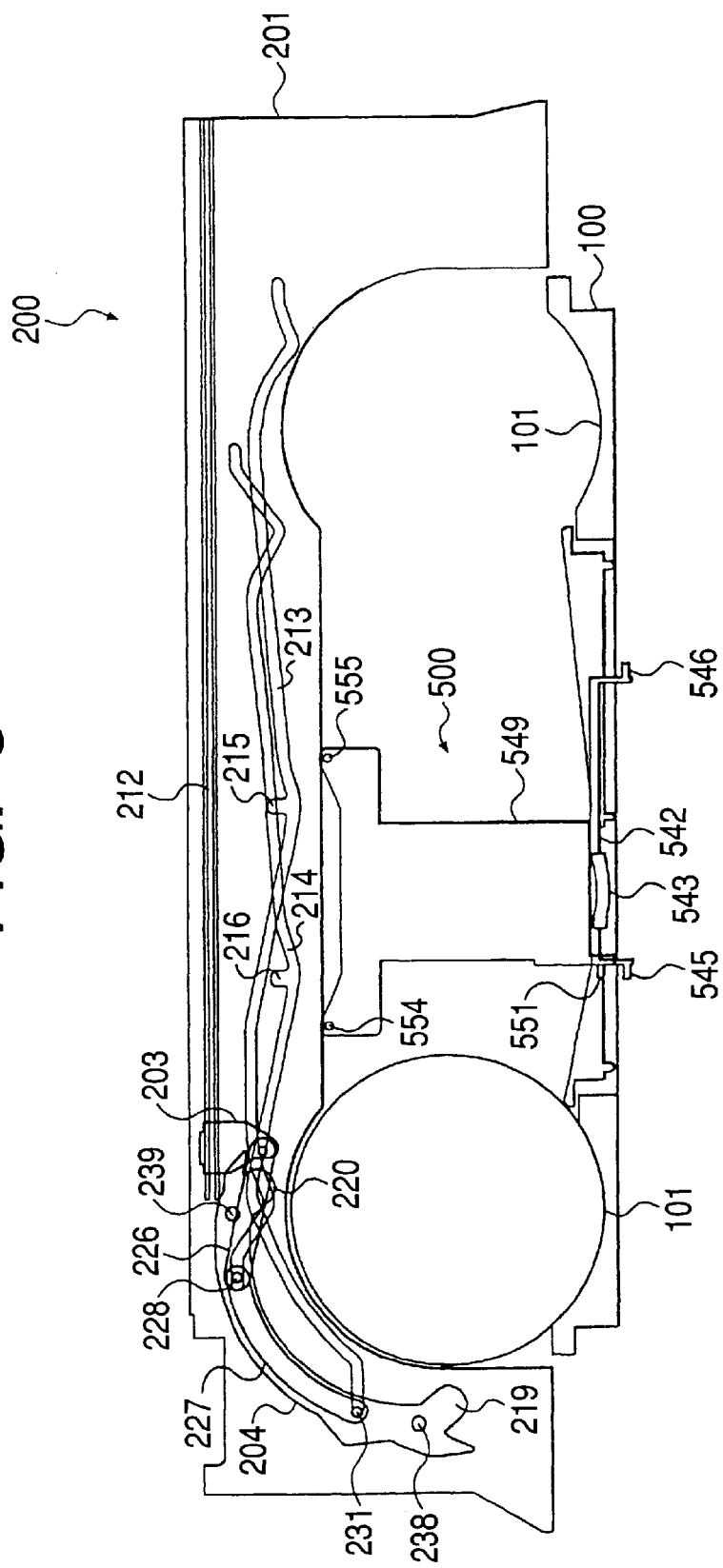
FIG. 8 is a view explaining an operation of the disc conveyance mechanism 200, and is a view showing an initial state to transfer the disc.

As shown in FIG. 8, with the carrier 204 put into the initial position to push out the disc from the rear, the control portion drives the motor 210 so as to rotate the timing belt with tooth 202. Accompanied with the rotation of the timing belt with tooth 202, the carriage 203 makes a sliding movement in a longitudinal direction of the sub-chassis 201, while allowing the rib 223 to be guided by the guide groove 212.

Following this carriage 203, the carrier 204 moves. At this time, the pin 231 of the arm 227 is guided by the cum groove 214 of the right side sub-chassis 209, and further, the pin 228 of the arm 227 is guided by the left side sub-chassis 208, so that the carrier 204 moves, while being controlled to a predetermined attitude to transfer the disc.

Figure 9:
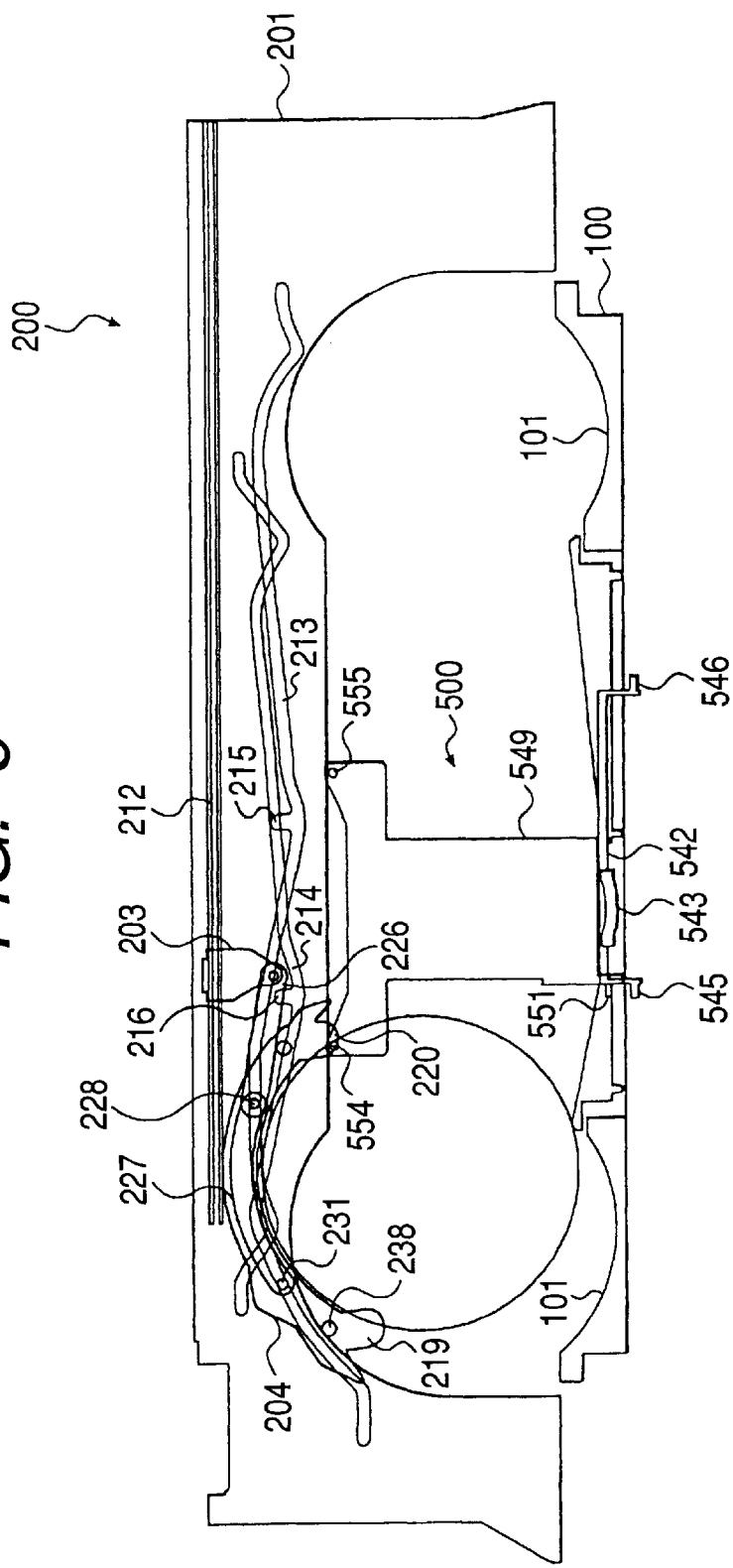
FIG. 9 is a view showing a state in which the disc begins to be transferred.

As shown in FIG. 9, the carrier 204 moving in this way grips the upper part of the disc by the grooves 219, 220 formed on both sides thereof, and pushes out the disc from the rear. In this way, the disc is transferred from the groove 101 of the rotary stocker 100.

Figure 10:
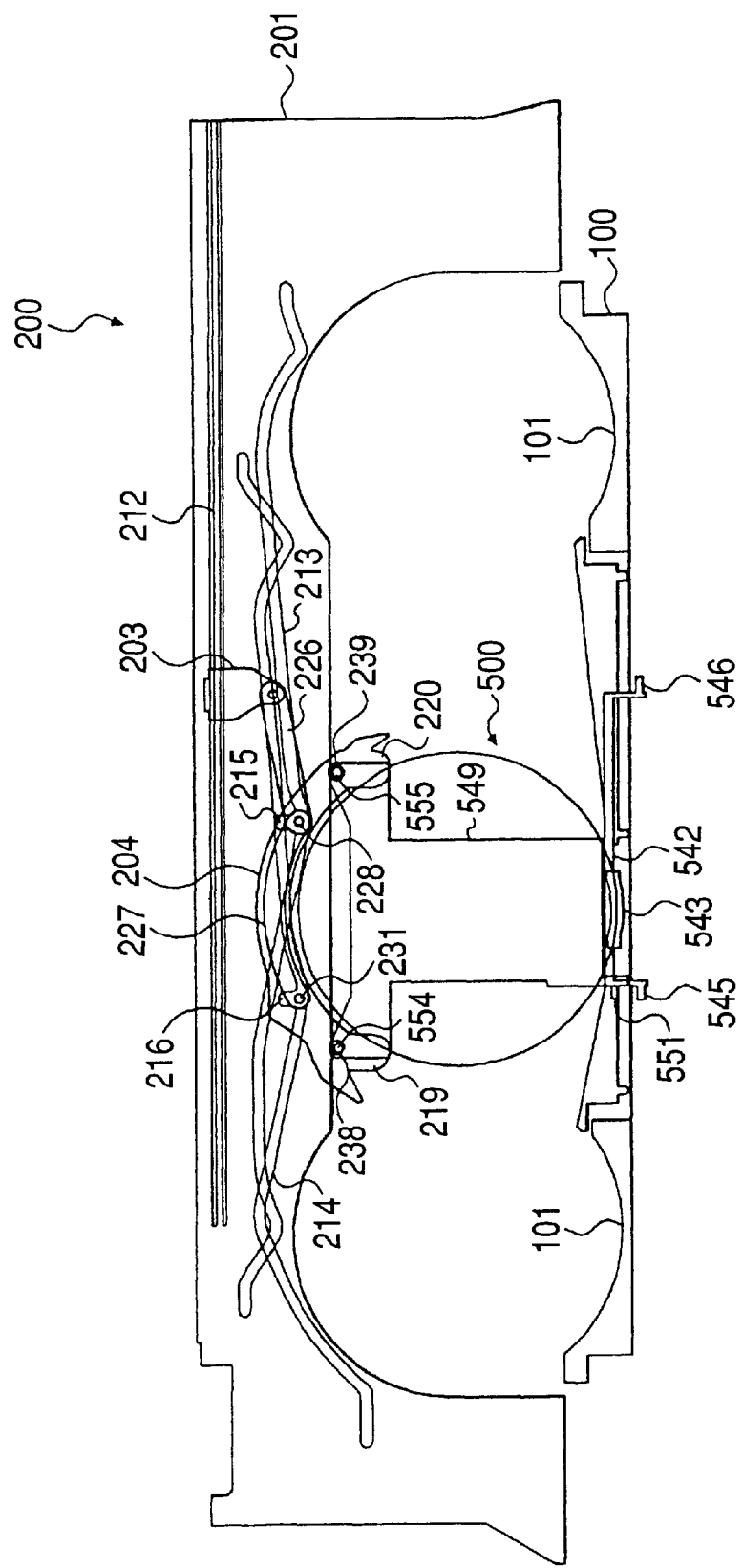
FIG. 10 is a view showing a state in which the disc was clamped in the playback portion 500.

As shown in FIG. 10, the disc finds its way to the playback portion 500 at last in this way. At this time, the protrusions 224, 225 formed on the side surface of the carriage 203 press-operate the center position detection switch 237. By obtaining this output signal, the control portion recognizes that the disc has been transferred to the playback portion 500. Based on this output signal, the control portion stops the rotation of the timing belt with tooth 202 so as to stop the carriage 203. At this time, as shown in FIG. 10, the pins 228,231 of the arm 227 are located downward of the refuge portions 215, 216 formed on the cum grooves 213, 214.

Subsequently, the disc is clamped at the playback portion 500.

Here, the protrusion 539 of the switching arm 538 passes through both a part protruded laterally from the L type groove 540 of the main slider 503 and a linear part of the L type groove 541, which faces in opposite direction to this L type groove 540. In this state, the control portion rotates the cum 520 so as to move the main slider 503, as a result of which, the protrusion 539 of the switching arm 538 is controlled by a part protruded laterally of the L type groove 540, so that the clamp slider 502 moves together with the main slider 503.

When the clamp slider 502 moves in this way, the TU slider 501 and the clamp slider 502 connected by the connecting arm 531 operate so as to move closer to each other. Then, with the clamber 507 provided for the clamp slider 502 put into an opening not shown which is formed in the center of the disc, the disc is clamped between the traverse portion 504 and the clamp chassis 505.

At this time, the control slider 550 operates integrally with the clamp chassis 505, and the protrusions 554, 555 of the control slider 550 fit into the holes 238, 239 of the carrier 204. In this way, the disc to be transferred by the carrier 204 is further reliably positioned.

Note that, during this time, even when the main slider 503 moves, the pin 552 of the control slider 550 is guided to a horizontal part of the cum groove 553, and the pins 545, 546 of the disc guide 542 are guided to the horizontal part of the escalator groove 548, respectively. For this reason, during the time leading up to termination of the clamping of the disc, the control slider 549 and the disc guide 542 do not move upward and downward, respectively.

After having clamped the disc at the playback portion 500, the control portion further rotates the cum 520. In this way, the protrusion 539 of the switching arm 538 abuts against the inner surface of the L type groove 541 formed on the chassis 508. When the cam 520 is further rotated, the switching arm 538 rotates, and the protrusion 539 of the switching arm 538 enters a linear part of the L type groove 540 from a part protruded laterally of the L type groove 540.

When the cum 520 is rotated from this state, since the protrusion 539 of the switching arm 538 is controlled by the inner surface of the L type groove 541, the main slider 503 alone moves by the TU slider 501 and the clamp slider 502 with the disc clamped.

Figure 11:
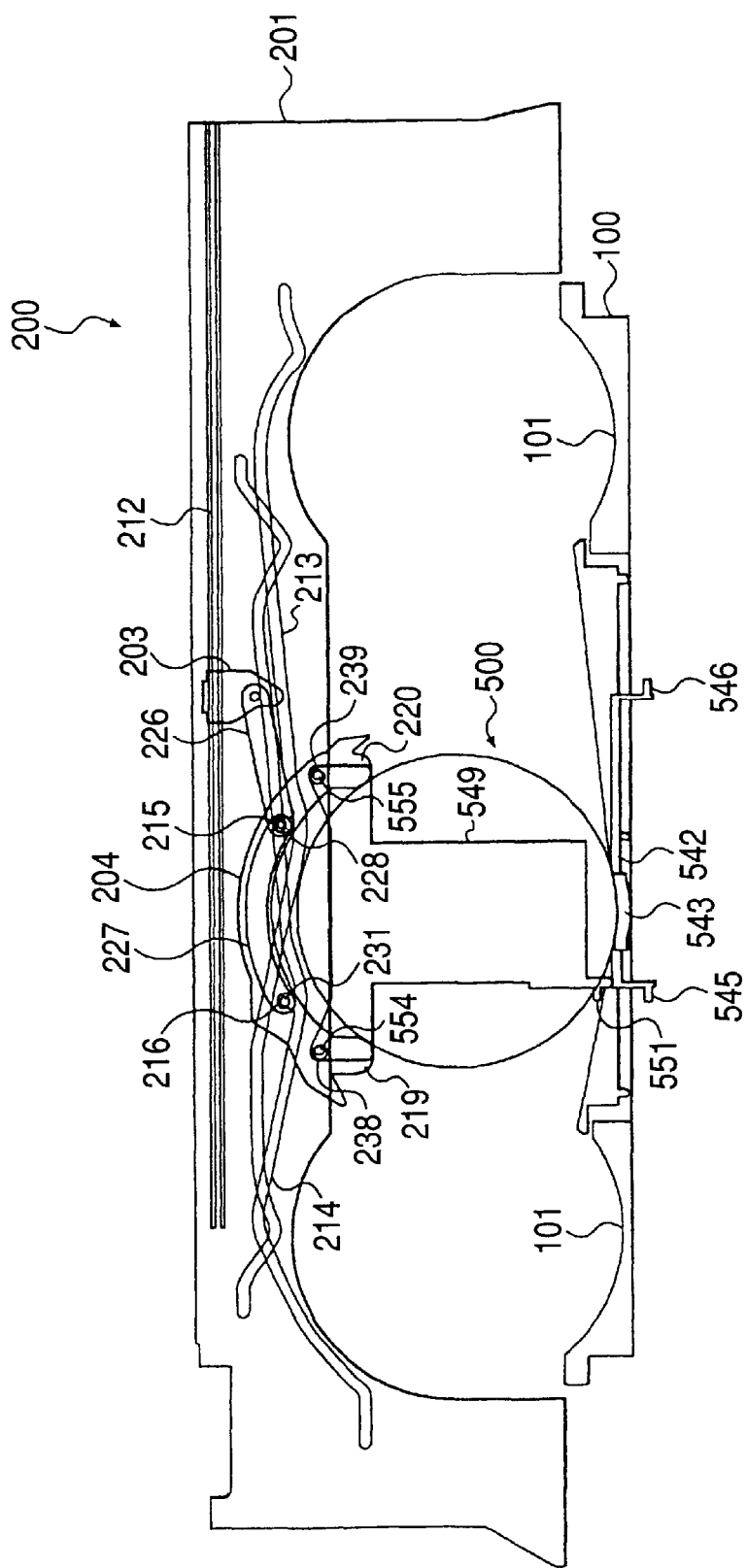
FIG. 11 is a view showing a state in which the disc clamped in the playback portion 500 is being reproduced.

When the main slider 503 alone moves in this way as shown in FIG. 11, the pin 551 of the control slider 549 is guided to a slant part of the cum groove 552 and ascends, and three pins 545, 546 of the disc guide 542 are guided to a slant part of the escalator grooves 547, 548, respectively and descends. As a result, the control slider 549 and the carrier 204, to which the protrusions 554, 555 of the control slider 549 fit, integrally rise, and the disc guide 542 descends.

As a result, as shown in FIG. 11, the pins 228, 231 of the arm 227 enter the refuge portions 215, 216, respectively. In this way, the carrier 204 and the guide portion 543, which were brought into contact with the peripheral portion of the disc, refuges upward and downward, respectively, and the disc is kept rotatable by the clamber 507. That is, the reproduction of the disc is put into a possible state.

After that, the disc changer transfers the disc from the playback portion 500 in the following manner.

First, the control portion rotates the cam 520 in a reverse direction from the time when the clamping is performed, and the TU slider 501 and the clamp slider 502 are operated in a direction away from each other. In this way, the carrier 204 and the guide portion 543 are brought into contact with the peripheral portion of the disc again, and the transferring of the disc is put into a possible state.

Figure 12:
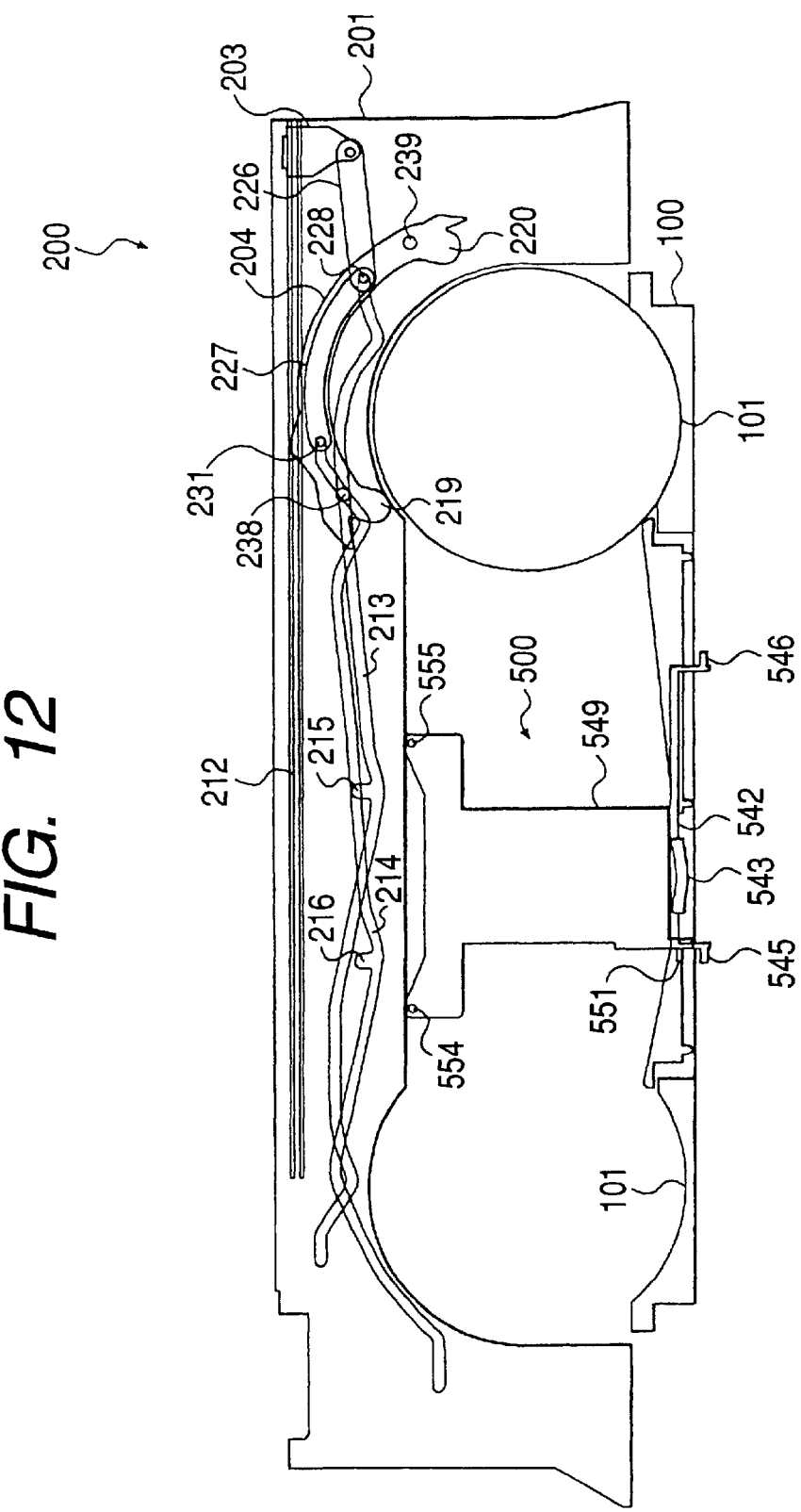
FIG. 12 is a view showing a state in which the disc was transferred to a groove 101 opposed 180 degrees.
Figure 13A:
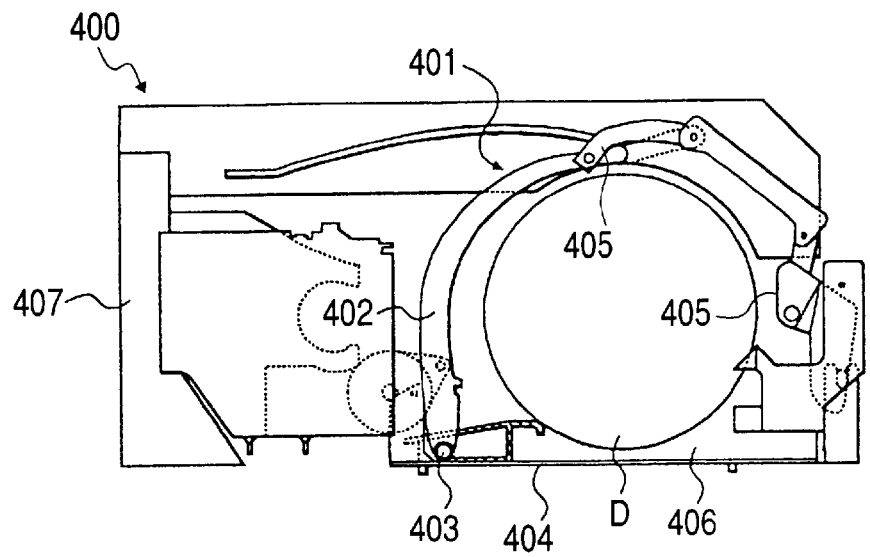
FIG. 13A, and FIG. 13B are views showing a state in which the disc is transferred by an arm 401 which is one example of a conventional disc conveyance mechanism.
Figure 13B:
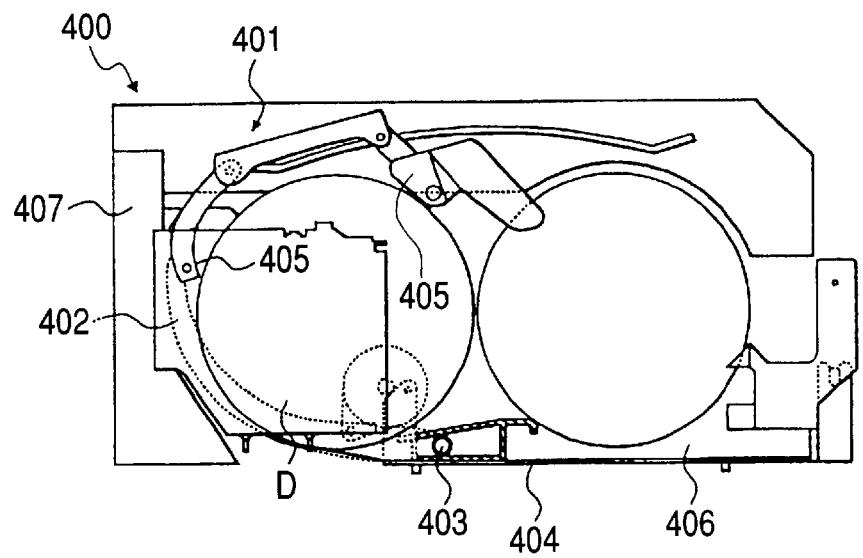

While the carriage 203 is allowed to perform a sliding movement, and the pins 228, 231 of the arm 227 are guided to the cum grooves 213, 214, the disc is further transferred by the carrier 204. In this way, the disc is transferred from the groove 101 of the rotary stocker 100, in which the disc was initially housed, to the groove 101 at an opposite side 180 degrees. As shown in FIG. 12, when the pins 228, 231 of the arm 227 find their ways to the cum groove 213, 214 at last, the grooves 219, 220 formed on both ends of the carrier 204 separate from the periphery of the disc, and the transferring of the disc is complete.

This disc changer reproduces a backside of the disc in the following manner.

After the disc was transferred to the groove 101 at a 180-degree opposite side by the above described procedure, the rotary stocker 100 is rotated until the disc comes to the position of the groove 101 in which the disc was housed before it was transferred. In this way, a direction of the disc to be housed in the groove 101 is reversed from the front side to the back side. After that, similarly as described above, the disc is transferred to the playback portion 500 so that the backside of the disc can be reproduced.

Further, in the case where the disc is already housed in the groove 101 opposed 180 degrees, the rotary stocker 100 may be rotated until the groove 101 which became empty by transferring the disc comes to a position opposed 180 degrees.

Finally, the playback portion and a reproducing method of the disc in the playback portion according to the present invention will be described.

As shown in FIG. 1, the disc changer according to the present invention comprises: a rotary stocker 100 which houses a plurality of discs radially in an upstanding state and which is circularly formed and; and a conveyance mechanism 200 for conveying one disc selected from among all the discs housed in the rotary stocker 100 in a nearly vertical state to a playback portion 300 located at an inner side center of the rotary stocker 100. The playback portion 300 comprises a disc gripper, and the selected and conveyed disc is reproduced in a gripped state by the gripper.

Figure 14:
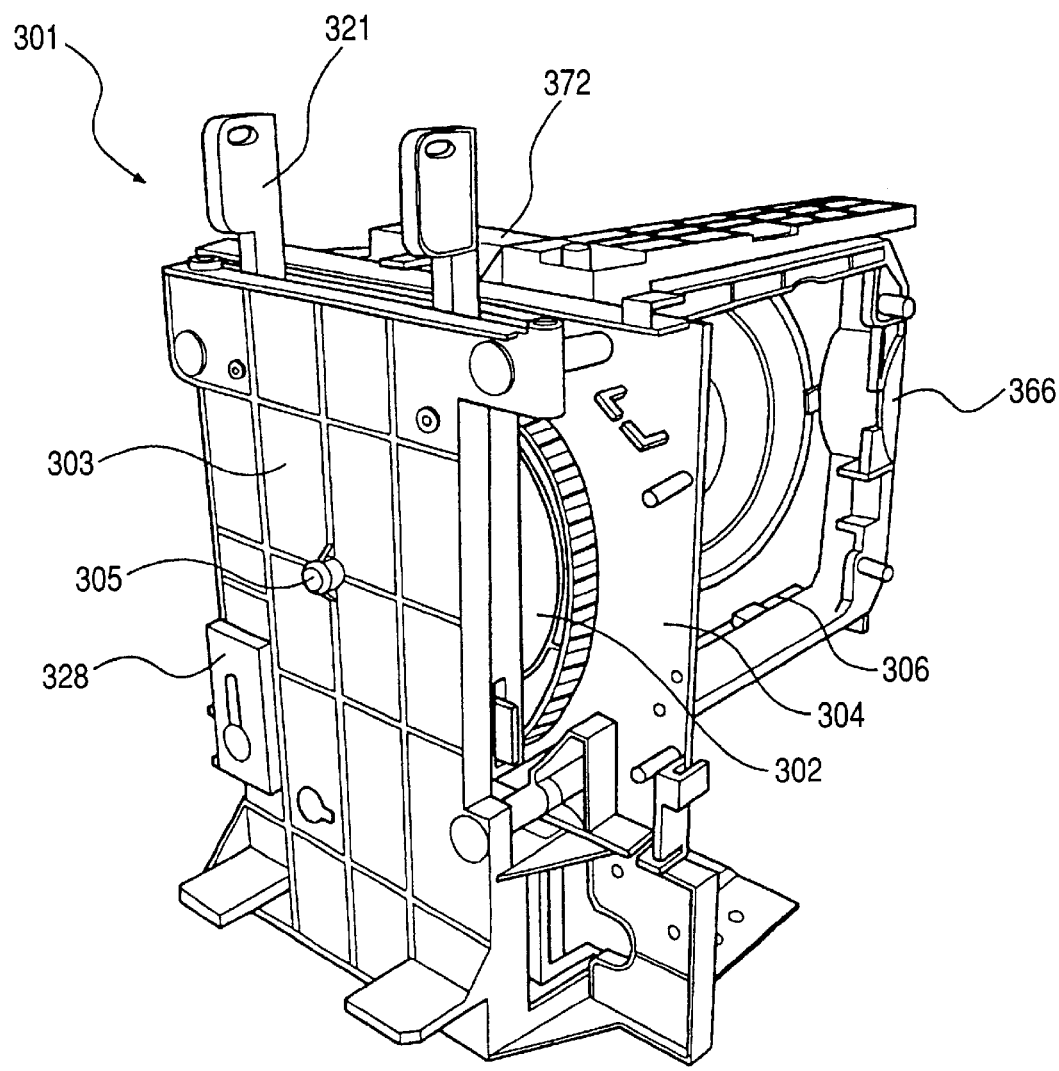
FIG. 14 is an external perspective view of a disc gripper 301 in a state of an arm being removed in the playback portion of the embodiment according to the present invention.

As shown in FIG. 14, the disc gripper 301 comprises: a rotary gear 302 provided in such a manner that it is rotated by drive of a driving motor and a backward and forward direction becomes a rotary axis; a first flat chassis 303 arranged in front of the rotary gear 302 and nearly in parallel to the rotary gear 302; and a second flat chassis 304 arranged at the back of the rotary gear 302 and nearly in parallel to the rotary gear 302. Further, the disc gripper 301 has an axis portion 305, which pierces through the rotary gear 302, the first chassis 303 and the second chassis 304, and comprises a third chassis 306 arranged at the back of the second chassis 304. That is, the rotary gear 302 is axially supported by the first chassis 303, the second chassis 304 and the third chassis 306.

Figure 15:
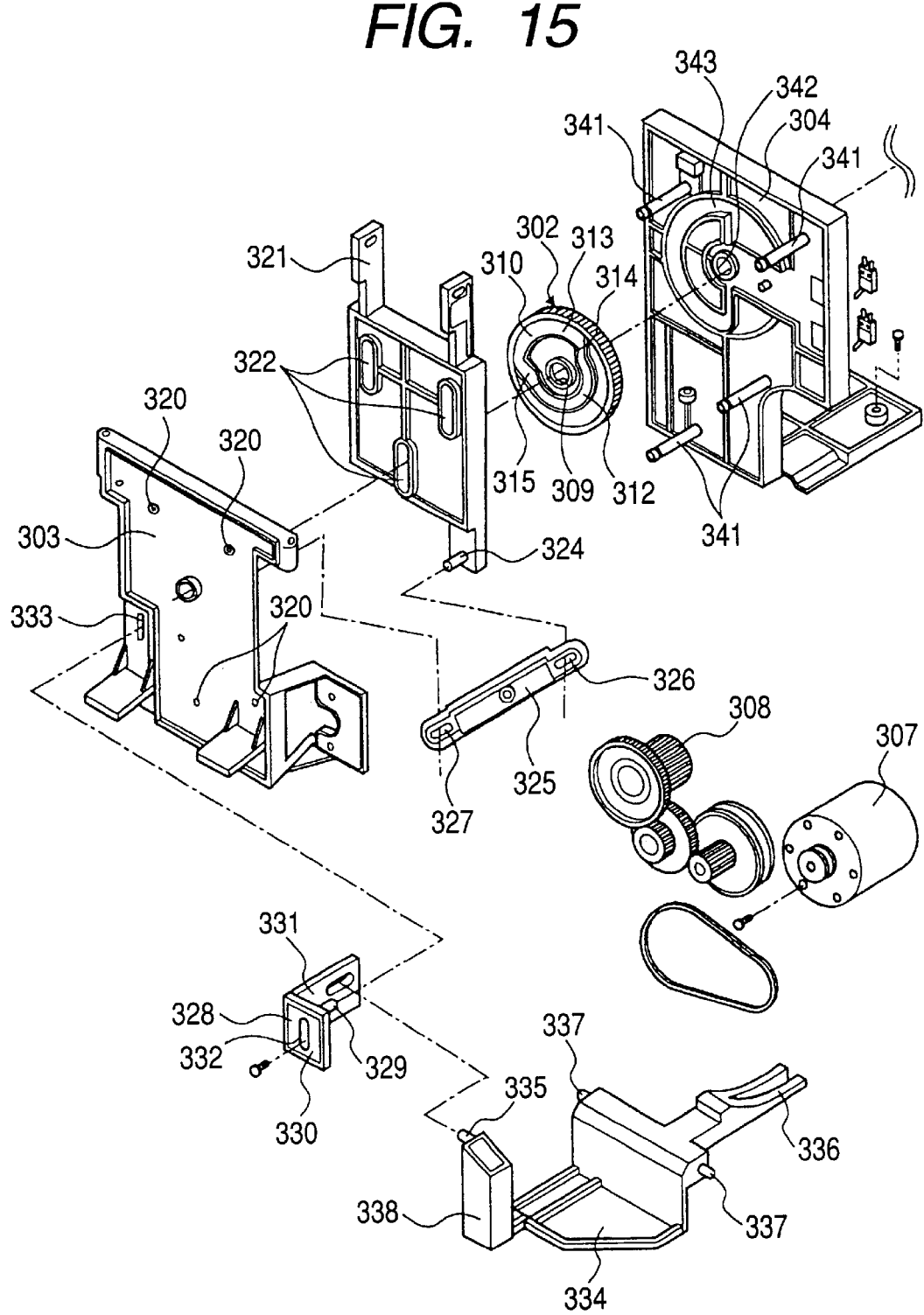
FIG. 15 is an exploded perspective view of apart including a first chassis 303 and a second chassis 304 of the disc gripper.

As shown in FIG. 15, tooth are formed on the outer periphery of the rotary gear 302, and the rotary gear 302 is allowed to engage with a transmission gear 308 to transmit a driving force of the driving motor 307. Further, a piercing hole 309 is formed in the center of the rotary gear 302, through which the axial portion 305 is pierced. Further, in front of the rotary gear 302, a hold guide groove 310 is formed, and at the back thereof, a rotary guide groove 311 shown in FIGS. 17A to 23C is formed, respectively.

As shown in FIGS. 17A to 23C, the hold guide groove 311 extends nearly in a circumferential direction of the rotary gear 302, and has a first guide portion 312 and a second guide portion 313, which are mutually different in a distance from the center of the rotary gear 302 and are nearly constant in the distance from each other. Here, in contrast to the second guide portion 313, the first guide portion 312 has a larger distance from the center of the rotary gear 302. Further, the guide groove for holding 310 has a third guide portion 314 and a fourth guide portion 315, which connect an end portion of the first guide portion 312 and the end portion of the second guide portion 313. That is, the third guide portion 314 and the fourth guide portion 315 are formed in such a manner that the distance from the center of the rotary gear 302 changes, and the guide groove for holding 310 is formed so as to make a round in the circumferential direction of the rotary gear 302.

Further, the rotary guide groove 311 has a first guide portion 316, which extends from the vicinity of the piercing hole 309 to a predetermined position in the vicinity of an outer edge, and a second guide portion 317, which extends from the outer edge side portion of the first guide portion 316 to the vicinity of the piercing hole 309. Each guide portion 316, 317 is formed in curvature so as to become convex at the outer edge side, respectively, and in the present embodiment, each guide portion 316, 317 is symmetrically formed relative to a linear line linking an outer edge side end portion from the center of the rotary gear 302. The rotary guide groove 311 fits into a boss 319 of a rotary slider 318 to be described later, and in the present embodiment, a rotary mechanism is constituted by having the rotary guide groove 311 and the rotary slider 318.

As shown in FIG. 15, the first chassis 303 has a plurality of screw holes 320 for piercing fixed screws, and by these fixed screws, the first chassis 303 and the second chassis 304 are fixed. Between the first chassis 303 and the second chassis 304, there is arranged a holding drive slider 321 movable upward and downward.

Further, the holding drive slider 321 as a moving member for holding is formed nearly parallel to the first chassis 303, in a form of flat plate, and guide grooves 322 extending upward and downward are formed on the upper part both sides and in the lower part central side. On the first chassis 303, cylindrical portions protruding backward from the backside are formed for each guide groove 322 formed on the upper part, and each guide groove 322 formed on the upper part is allowed to abut against an outer peripheral surface of each cylindrical portion. Here, the under part guide groove 322 is allowed to abut against the outer peripheral surface of the axial portion 305 of the third chassis 306. Further, a female screw portion is formed on the inner peripheral surface of each cylindrical portion, and by a slider fix screw which screws together this female screw portion, a backward movement of the holding drive slider 321 is controlled.

Further, on the rear surface of the holding drive slider 321, a hold boss 323 which protrudes backward and fits into the above described guide groove for holding 310 is formed. That is, as shown in FIGS. 17A to 23C, the boss 323 is slidable inside the guide groove for holding 310, and by the rotation of the rotary gear 302, the boss 323 is guided by the guide groove for holding 310, so that the holding drive slider 321 is allowed to move upward and downward. Here, when the boss 323 moves inside the third guide portion 314 or the fourth guide portion 315, the holding drive slider 321 moves upward or downward. Further, when the boss 323 moves inside the first guide portion 312 and the second guide portion 313, the holding drive slider 321 does not move upward and downward, but upward and downward positions of the holding drive slider 321 are kept constant.

As shown in FIG. 15, a boss 324 protruding forward is formed on the left side front surface of the under part of the holding drive slider 321. This boss 324 fits into a first groove 326 of a link 325, which is axially supported by the first chassis 303, and by upward and downward movements of the holding drive slider 321, the link 325 is allowed to oscillate. The link 325 extends nearly to the left and to the right, and the practically center thereof is rotatably fixed to the first chassis 303, and the first groove 326 extending longitudinally is formed on the left, and the second groove 327 extending longitudinally is formed on the right, respectively. That is, when the holding drive slider 321 moves upward, the first grove 326 side moves upward, and at the same time, the second groove 327 side moves downward, and when the holding drive slider 321 moves downward, the first groove 326 side moves downward, and at the same time, the second groove 327 moves upward.

Further, the second groove 327 of the link 325 fits into the boss 329 of a slider for holding 328. The slider for holding 328 is provided to the first chassis 303 movably upward and downward, and has a first flat surface portion 330 abutting against the front surface right side of the first chassis 303 and a second flat surface portion 331 extending forward from the right side under part of the first flat surface portion 330. A guide groove 332 extending upward and downward is formed on the first flat surface portion 330, and by a control screw which pierces this guide groove 332 and screws together a female hole of the first chassis 303, forward movement of the slider for holding 328 is controlled. The boss 329 is projectingly provided on the first flat surface portion 330, and fits into an auxiliary slider guide groove 333 formed on the right side of the first chassis 303 and the second groove 327 of the link 325. That is, the boss 329 is guided to the guide groove 333 of the first chassis 303 so that the slider for holding 328 moves upward and downward. The guide groove 332 extending nearly backward and forward is formed on the second flat surface 331, and this guide groove 332 fits into a boss 335 of a disc holder 334.

As shown in FIG. 15, the disc holder 334 as a holding portion has the holding portion 336 which holds the under end of the selected disc D and extends nearly backward and forward, a rotary axial portion 337 axially supported by the second chassis 304 at the backside of the holding portion 336 and a driving force transmitting portion 338 having the boss 335, which is formed at the backside of the rotary axial portion 337 and protrudes to the right. That is, the holding drive slider 321 and the disc holder 334 are connected, and when the slider for holding 328 moves upward and downward, the disc holder 334 oscillates with the rotary axial portion 337 as a center, so that the holding portion 336 is allowed to oscillate upward and downward.

As shown in FIGS. 17A to 23C, a pair of arms 339 capable of oscillating is provided on the upper end of the holding drive slider 321. Each arm portion 339 is formed by extending backward from the upper end of the holding drive slider 321, and when the holding drive slider 321 moves downward, the rear side of each arm 339 is allowed to move upward. Here, in the case where the disc D selected by the conveyance mechanism 200 is conveyed to the gripper 301, a conveyance holding portion 340 of the conveyance mechanism 200 is allowed to engage with each arm 339. When the rear side of each arm 339 moves upward, the conveyance holding portion 340 also moves upward so that the holding of the upper peripheral side of the selected disc D is allowed to be released. That is, in the present embodiment, the guide groove for holding 310, the holding drive slider 321, the link 325, the slider for holding 328, the disc holder 334 and each arm 339 constitute a holding mechanism.

As shown in FIG. 15, on the front surface of the second chassis 304, corresponding to each screw hole 320 of the first chassis 303, a cylindrical portion 341 protruding forward is formed. A female screw portion is formed in the inner peripheral surface of the cylindrical portion 341, and is allowed to screw together with the above-described fixed screw. Further, a piercing hole 342 for piercing the axial portion 305 of the third chassis 306 is formed on the second chassis 304. Furthermore, a guide groove 343 to fit into the boss 319 of the rotary slider 318, which is provided in the third chassis 306, is formed on the second chassis 304. As shown in FIGS. 17A to 23C, this guide groove 343 has a first guide portion 344 extending upward and downward at the lower part of the piercing hole 342, a second guide portion 345 extending upward and downward at the upper part of the piercing hole 342, and a third guide portion 346 formed in the shape of a circular arc, which is connected to the lower end of the first guide portion 344 and the upper end of the second guide portion 345 and extends clockwise viewed from the front side with the piercing hole 342 as a center. In the present embodiment, the guide groove 343 is symmetrically formed in the upper and lower sides, and in the center of the third guide portion 346, a stop portion 347 bent radially outside is formed, in which a radius of curvature is formed smaller in contrast to other parts.

Figure 16:
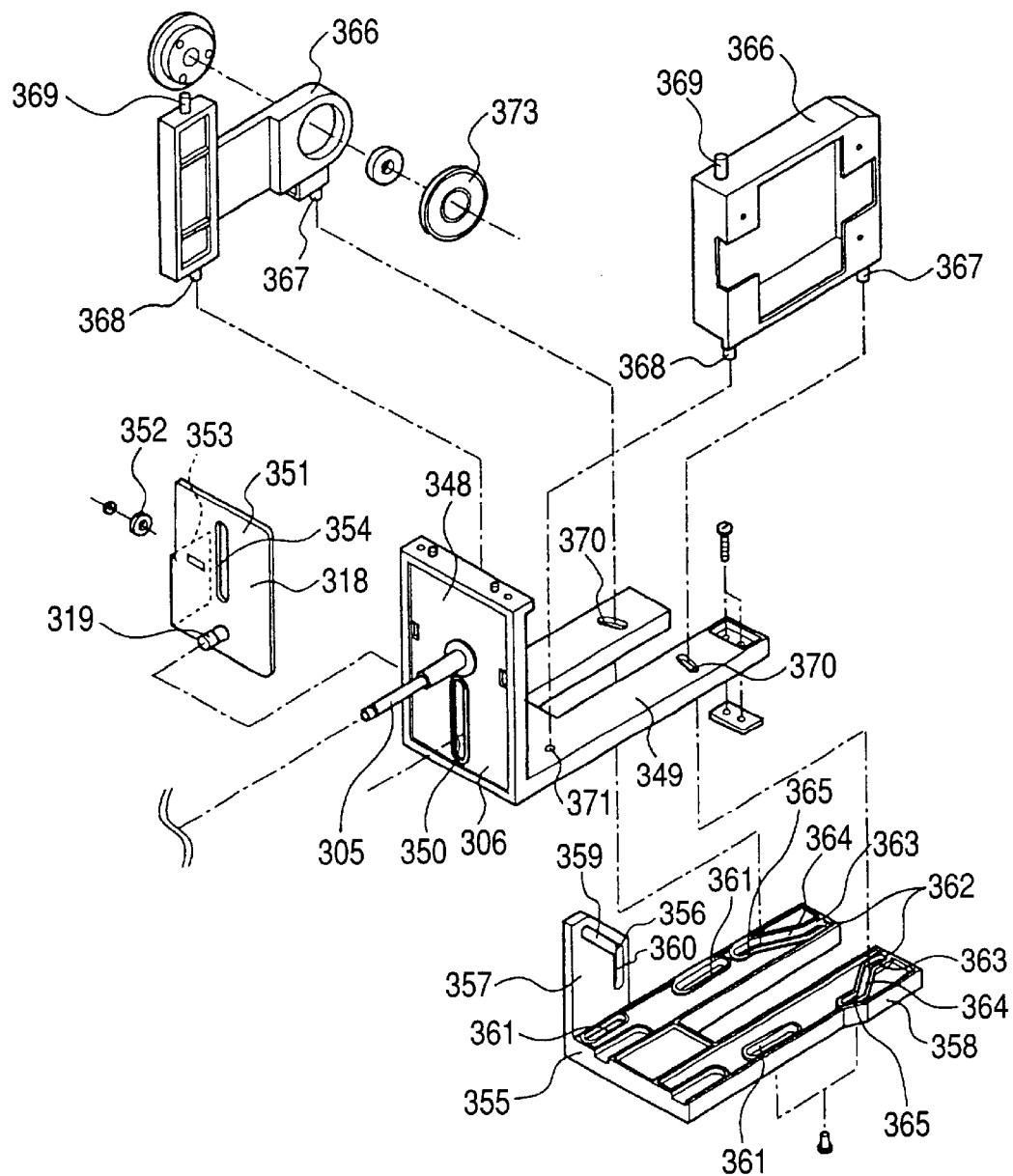
FIG. 16 is an exploded perspective view of apart including a third chassis 306 and a disc gripping portion 366 of the disc gripper.

As shown in FIG. 16, the third chassis 306 as the rotary portion is formed nearly in the shape of a L-letter viewed from the front side, and has a vertical surface 348 nearly parallel to the second chassis 304 and a horizontal surface 349 extending backward from the lower end of the vertical surface 348. The above described axial portion 305 extending forward is formed on the vertical surface 348, and the third chassis 306 is rotatable for the first chassis 303 and the second chassis 304. A guide groove 350, which fits into the boss 319 of the rotary slider 318 and extends upward and downward, is formed at the lower part of the axial portion 305 of the vertical surface 348.

Further, the rotary slider 318 as a rotary moving member is formed nearly in the shape of a plate, and has an abutting portion 351 which abuts against the rear surface of the vertical surface 348 and a roller installing surface 353 which extends backward from the right end lower part of the abutting portion 351 and is installed with a roller 352 at the right side surface. Claws are formed at the rear side left and right end portions of the vertical surface 348 of the third chassis 306, and the left and right end portions of the abutting portion 351 are hooked by these claws, so that backward movement of the rotary slider 318 is controlled. The above described boss 319 is projectingly provided in the front surface of the abutting portion 351, and a guide groove 354 extending upward and downward is formed at the upper part of this boss 319. This guide groove 354 fits into the rear end portion of the axial portion 305, which protrudes from the rear surface side of the vertical surface 348 of the third chassis 306. That is, the rotary slider 318 is made movable in a longitudinal direction of the guide groove 354 relative to the third chassis 306. The roller 352 rotatable with the left and right directions as a center is provided on the right side surface of the roller installing surface 353, and this roller 352 is allowed to fit into a first guide groove 356 of an oscillating drive slider 355.

The oscillating drive slider 355 has a plate-shaped vertical surface portion 357, in which the first guide groove 356 is formed and which extends upward and downward, and a plate-shaped horizontal surface portion 358, whose right end front side is connected to the lower end of the vertical surface portion 357, and which extends backward and forward. The first guide groove 356 has a first guide portion 359 which inclines downward and extends backward and forward and a second guide portion 360 which extends downward from the rear end of the first guide portion 359. Further, a plurality of second guide grooves 361 extending backward and forward are formed on the horizontal surface portion 358, and each second guide groove 361 fits into each cylindrical portion (not shown in figure) which is formed by protruding to the under surface of the horizontal surface 349 of the third chassis 306. Here, each cylindrical portion has a female screw portion in the inner peripheral surface, and screws together with a control screw to control downward movement of the horizontal surface portion 358. That is, the upper surface of the horizontal surface portion 358 abuts against the under surface of a horizontal surface 349 of the third chassis 306, and the oscillating drive slider 355 is made movable backward and forward. Further, at the rear portion of the horizontal surface portion 358, a pair of left and right third guide grooves 362 are formed. Each third guide groove 362 has a first guide portion 363 extending backward and forward at the center side of the horizontal surface portion 358, a second guide portion 364 which extends obliquely outside and forward from the front end of the first guide portion 363 and a third guide portion 365 which extends forward from the front end of the second guide portion 364. Here, each third guide portion 362 is allowed to fit into the boss 367 of each gripping portion 366.

Each gripping portion 366 is formed nearly in the shape of a plate with a longitudinal direction taken as a normal line, and has a boss 367 projectingly provided in the rear portion lower end, a rotary axial portion 368 projectingly provided in the front portion lower end, and a rotary axial portion 369 projectingly provided in the front portion upper end. Each boss 367 fits into each oscillating groove 370 formed on the horizontal surface 349 of the third chassis 306 and each third guide groove 362 of the oscillating slider 355. Here, each oscillating groove 370 is concavo-concave in front and formed extending nearly to the left and the right. The rotary axial portion 368 projectingly provided at the front portion under end of each gripping portion 366 fits into each rotary hole 371 formed on the horizontal surface 349 of the third chassis 306. Further, a bracket 372 extending nearly backwards is fixed on the upper end of the vertical surface 348 of the third chassis 306, and each rotary hole formed on this bracket 372 fits into each rotary axial portion 369 projectingly provided at the front portion upper end of each gripping portion 366. That is, each gripping portion 366 is capable of oscillating relative to the third chassis 306, and is allowed to oscillate accompanied with movement toward the guide groove 350 of the rotary slider 318. A clamber 373 is provided nearly in the center of each gripping portion 366, and each gripping portion 366 rotates in a direction to approach mutually, so that the disc held by the disc holder 334 and the conveyance holding portion 340 is allowed to be fastened. That is, in the present embodiment, the oscillation mechanism is constituted of the third chassis 306 and the oscillating drive slider 355. Further, the playback portion 300 for reproducing the selected disc is installed at the gripping portion 366 at the left side.

An operation of the disc gripper 301 in the disc changer constituted as above will be described. Here, as an initial state, as shown in FIGS. 17A to 17C, the boss 323 of the holding drive slider 321 is located at the end portion of the first guide portion 312 of the guide groove for holding 310, and the boss 319 of the rotary slider 318 is located at the center side end portion of the first guide portion 316 of the rotary guide groove 311 as well as at the piercing hole 342 side end portion of the first guide portion 344 of the guide groove 343.

First, when the disc selected by the conveyance mechanism 200 is conveyed to the disc gripper 301, as shown in FIG. 17A to FIG. 17C, the disc D is held by the holding portion 336 of the disc holder 334 and the conveyance holding portion 340 of the conveyance mechanism 200.

Next, as shown in FIGS. 18A to 18C, when the drive motor 307 is driven to rotate the rotary gear 302, the boss 319 of the rotary slider 318 which fits into the rotary guide groove 311 of the rotary gear 302 is guided by the first guide portion 316, and moves downward along the guide groove 350 of the third chassis 306. That is, the rotary slider 318 moves downward. At this time, since the boss 323 of the holding drive slider 321 moves inside the first guide portion 312 of the guide groove for holding 310, the holding drive slider 321 will not move upward and downward.

When the rotary slider 318 moves downward, the roller 352 moves inside the first guide portion 359 of the first guide groove 356. At this time, since the first guide portion 359 inclines forward, each second guide groove 361 is guided to each cylindrical portion, so that the oscillating drive slider 355 moves forward. When the oscillating drive slider 335 moves forward, the boss 367 of each gripping portion 366 moves to the inside of the left and right when moving on the second guide portion 364 of each third guide grove 362, and moves to the inside of the left and right of each oscillating groove 370. In this way, as shown in FIGS. 18A to 18C, each gripping portion 366 moves in a direction to approach mutually, and the disc D is gripped by each clamber 373.

Next, as shown in FIGS. 19A to 19C, when the rotary gear 302 is further rotated, the boss 323 of the holding drive slider 321 reaches the third guide portion 314 from the first guide portion 312 of the guide groove for holding 310, and moves the third guide portion 314. That is, the holding drive slider 321 moves upward, and the conveyance holding portion 340 is moved upward by the arm 339, and at the same time, the holding portion 336 of the disc holder 334 moves downward. In this way, the holding of the disc D is released.

Next, as shown in FIGS. 20A to 20C, when the rotary 302 is further rotated, the boss 319 of the rotary slider 318 reaches the lower end of the first guide portion 344, and moves inside the third guide portion 346. Here, since the third guide portion 346 is formed in the shape of a circular arc with the piercing hole 342 as a center, the third chassis 306, each gripping portion 366 and the like rotate together with the rotary gear 302. That is, the disc gripped by the clamber 373 of each gripping portion 366 rotates with the third chassis 306 and the like. At this time, the boss 319 does not move inside the rotary guide groove 311, but is in a state of remaining at a zone in the vicinity of an outer edge side end portion of the first guide portion 316. Further, at this time, since the boss 323 of the holding drive slider 321 moves inside the second guide portion 313 of the guide portion for holding 310 of the rotary gear 302, the holding drive slider 321 will not move upward and downward.

Further, when the boss 319 reaches the stop portion 347 of the third guiding portion 346, the boss 319 reaches the outer edge side end portion of the first guide portion 316, and the third chassis 306, each gripping portion 366 and the like are put into a stabilized state. In this state, the driving of the drive motor 307 is stopped, and the reproduction of the disc D is preformed.

Here, when it is necessary to rotate the disc D in reverse, as shown in FIGS. 21A to 21C, the drive motor 307 is driven and the rotary gear 302 is further rotated. Then, the boss 319 further moves inside the third guide portion 346, and until the boss 319 reaches the end portion of the third guide portion 346, the third chassis 306, each gripping portion 366 and the like further rotate. When the boss 319 reaches the end portion of the third guide portion 346, the third chassis 306, each gripping portion 366 and the like are put into a reversed state.

Next, as shown in FIGS. 22A to 22C, when the rotary gear 302 is further rotated, the boss 323 of the holding drive slider 321 reaches the fourth guide portion 315 from the second guide portion 313 of the guide groove for holding 310, and moves inside the fourth guide portion 315. That is, the holding drive slider 321 moves downward, and the conveyance holding portion 340 is moved downward by the arm 339, and at the same time, the holding portion 336 of the disc holder 334 moves upward. In this way, the disc D is held.

Figure 23A:
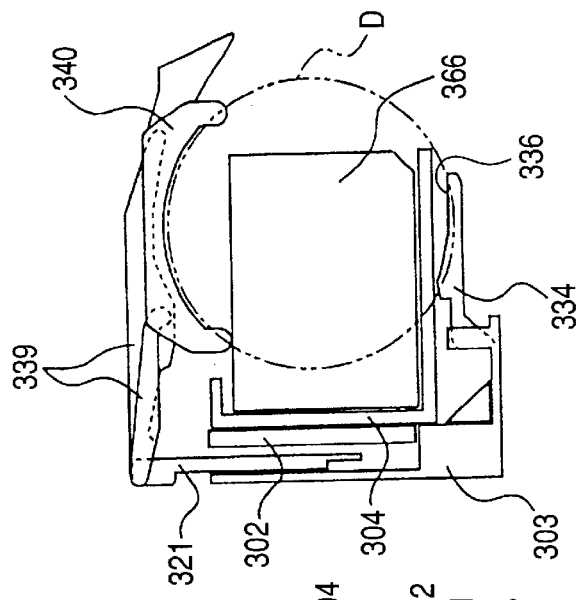
FIG. 23A, FIG. 23B, and FIG. 23C are explanatory views of the disc gripper 301 showing a state of the disc being held by the holding portion 336 and a state of the gripping of the disc being released by the gripping portion 366.
Figure 23B:
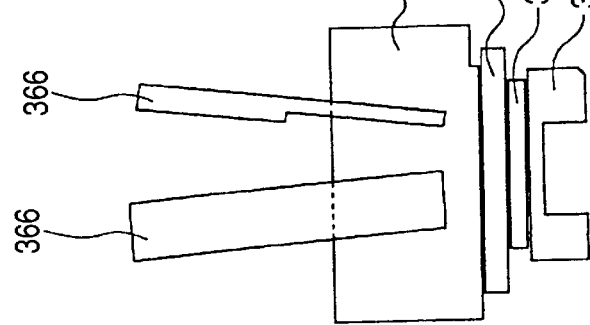
Figure 23C:
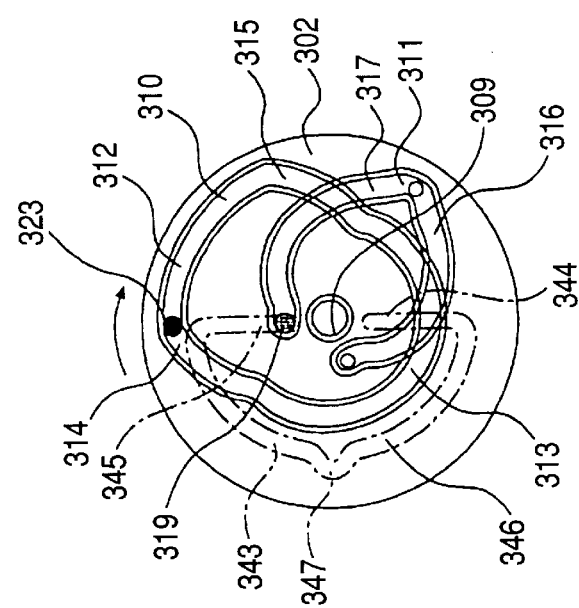

Next, as shown in FIGS. 23A to 23C, when the rotary gear 302 is further rotated, the boss 319 of the rotary slider 318, which fits into the rotary guide groove 311 of the rotary gear 302, is guided to the second guide portion 317, and moves downward along the guide groove 350 of the third chassis 306. That is, the rotary slider 318 moves downward. At this time, since the boss 323 of the holding drive slider 321 moves inside the first guide portion 312 of the guide groove for holding 310 of the rotary gear 302, the holding drive slider 321 will not move upward and downward.

When the rotary slider 318 moves downward, the roller 352 moves inside the first guide portion 359 of the first guide groove 356. At this time, since the first guide portion 359 inclines forward, each second guide groove 361 is guided to each cylindrical portion so that the oscillating drive slider 355 moves backward. When the oscillating drive slider 355 moves backward, the boss 367 of each gripping portion 366 moves in the direction of the left and right when moving on the second guide portion 364 of each third guiding groove 362, and moves in the direction of the left and right of each oscillating groove 370. In this way, each gripping portion 366 moves in a direction away from each other, and the gripping of the disc D by each clamber 373 is released.

Next, the disc selected by the conveyance mechanism 200 is conveyed again to the rotary stocker 100. At this time, the disc to be housed into the rotary stocker 100 is put into a state of having the front and back reversed. After the drive motor 307 has been driven so as to rotate the rotary gear 302 in a reversal direction and the disc gripper 301 has been put into the initial state, the disc is conveyed again to the disc gripper 301 by the conveyance mechanism 200. After that, the drive motor 307 is driven so as to rotate the rotary gear 302, and the disc is held horizontal, and the reproduction of the disc D is performed.

That is, in the case where the selected disc D is a disc having information on one side of the disc such as CD and the like, the disc D gripped in a state of being nearly vertical is conveyed to the disc gripper 301 by the conveyance mechanism 200, and the disc D gripped by the disc gripper 301 is rotated so as to be nearly horizontal, and the disc is reproduced by the playback portion 300 in a nearly horizontal state.

Further, in the case where the selected disc is a disc having information on both sides of the disc such as DVD (Digital Versatile disc) and the like, and where it is necessary to rotate the disc D in reverse, the disc D is conveyed to the disc gripper 301 by the conveyance mechanism 200 in a nearly vertical state, and the disc D gripped by the disc gripper 301 is rotated so as to be reversed and put into an upstanding state, and the reversed disc D is conveyed to the rotary stocker 100 by the conveyance mechanism 200, and the disc put into the reversed state is conveyed to the disc gripper 301 by the conveyance mechanism 200, and the disc gripped by the disc gripper 301 and in the reversed state is rotated so as to be nearly horizontal, and the disc is reproduced by the playback portion 300 in a nearly horizontal state.

In this way, according to the reproduction method of the information recording medium in the disc changer of the present embodiment, the disc D is reproduced nearly in a horizontal state, and, therefore, in contrast to the conventional method to reproduce the disc by putting it nearly into a vertical state, a load applied to each part of the playback portion 300 can be reduced, and the disc can be reproduced in a stabilized state. For example, in the playback portion 300, since a load by deadweight is not brought to bear on an object lens and the like of a pick-up, information on the selected disc can be reliably read. Further, for example, in the playback portion 300, any load by deadweight of the disc and a motor shaft is not applied to the motor shaft to rotate the disc, and, therefore, rotational accuracy will not be deteriorated. Further, a vibration characteristic of the playback portion 300 is enhanced, thereby contributing to improve reliability, durability and the like of the playback portion 300.

Further, according to the reproduction method of the information recording medium in the disc changer of the present embodiment, after the selected disc D has been reversed by the disc gripper 301, the reversed disc is reproduced, and it is therefore possible to reproduce the disc, on both sides of which information is recorded.

Further, according to the disc changer of the present embodiment, the disc gripper 301 allows each gripping portion 366 is rotated in a state of each gripping portion 366 gripping the disc D, and the disc is reproduced nearly in a horizontal state, and therefore, in contrast to the conventional disc changer which reproduces the disc nearly vertical, the load applied on each part of the playback portion 300 can be reduced, and the disc can be reproduced in a stabilized state.

Further, according to the disc changer of the present embodiment, the disc gripper 301 allows each gripping portion 366 to rotate in reverse in a state of each gripping portion 366 gripping the disc, and reproduce the reversed disc D, and therefore, it is possible to reproduce the disc, on both sides of which information is recorded.

Further, according to the disc changer of the present embodiment, each gripping portion 366 is allowed to rotate together with the third chassis 306, and therefore, the disc D can be rotated in a state of each gripping portion 366 gripping the disc, and the disc can be rotated in a simple construction.

Further, according to the disc changer of the present embodiment, each gripping portion 366 is allowed to oscillate by the movement of the rotary slider 318, and therefore, a timing between the rotation of each gripping portion 366 and the oscillation of each gripping portion 366 can be accurately determined. That is, when the boss 319 of the rotary slider 318 moves in a third guide path of the guide groove 343 in the second chassis 304, each gripping portion 366 rotates, and when the boss 319 moves in a first and a second guide paths, each gripping portion 366 oscillates, and therefore, for example, each gripping portion 366 will not simultaneously perform rotation and oscillation, thereby causing the changer to perform improper operations. Further, rotation and oscillation of each gripping portion 366 is accomplished by the rotary slider 318 only, and therefore, the number of parts can be cut back, and the lowering of the production cost can be attempted.

Further, according to the disc changer of the present embodiment, the disc holder 334 and the conveyance holding portion 340 are allowed to be driven by rotation of the rotary gear 302, and therefore, holding operation, gripping operation and rotational operation can be performed by one drive motor 307, and in contrast to the changer having a driving portion and the like separately in each of these operations, the number of parts can be cut back and the lowering of the production cost can be attempted.

Further, according to the disc changer of the present embodiment, the disc is held by each gripping portion 366 in a state of the selected disc being held by the conveyance holding portion 340 and the disc holder 334, and after that, the holding of the disc is released and the gripping portion 366 is allowed to rotate, and therefore, the disc can be reliably and adequately held horizontally.

Further, according to the disc changer of the present embodiment, each gripping portion 366 is rotated in a state of the selected disc D being gripped, and the disc is rotated in reverse, and after the disc is held by the conveyance holding portion 340 and the disc holder 334, the gripping of the disc is allowed to be released, and therefore, the disc can be reliably and adequately rotated in reverse.

Note that constitutions of the rotary mechanism, the oscillation mechanism and the holding mechanism in the above described embodiment are optional, and it is a matter of course that, in addition to the above, specific minute details of the constitutions and the like can be also adequately modified.

According to the present invention, in the disc changer, taking out and housing operations of the disc from a desired slot, conveyance of the disc from the disc housing portion to the disc reproducing portion and reproduction of the disc at the playback portion can be rapidly, reliably and stably performed.

That is, in the disc housing portion, taking out and housing of the disc can be easily performed by the disc exchange support mechanism. Further, the conveyance mechanism of the disc is arranged on the upper part of the disc-shaped rotary stocker provided radially with the disc housing groove in plural pieces, and therefore, the component member to transfer the disc to the playback portion is not accompanied by a large movement, and a stroke to transfer the disc is neither elongated. Further, the rib, which constitutes the conveyance mechanism, is guided to the guide groove, so that the transfer of the disc is extremely stabilized. Hence, the disc can be stably transferred, and the disc changer comprising an extremely compact disc conveyance mechanism can be obtained.

Further, in the disc playback portion, the constitution and the method of reproducing the disc nearly horizontal is adapted, and therefore, the selected disc can be reproduced in an extremely stabilized state.

What is claimed is:

1. A disc changer, comprising: a playback portion for reproducing information recorded on a disc; a disc-shaped housing portion rotatably placed on the periphery of said playback portion; a housing groove for housing one piece of the discs in an upstanding state provided in plural radial patterns on the upper surface of said housing portion; an opening for disc exchange; an inputting portion for designating a desired housing groove; and a moving means for moving the designating housing groove to a designated disc exchange position of said opening;

wherein said disc changer comprises a disc exchange support mechanism having means for pushing upward the disc inside said housing groove arranged on said disc exchange position and light-emitting means for allowing said housing groove positioned at said disc exchange position to be recognized.

2. The disc changer according to claim 1, wherein said disc exchange support mechanism comprises:

a linear through-hole provided in each housing groove;

a disc pushing-up portion arranged in said disc exchange position having a protruding portion made of a translucent material capable of protruding upward from downward of said linear through-hole and a rotary portion integrally attached to said protruding portion and rotating with a rotary axis as a center; and light-emitting means for allowing said housing groove positioned at said disc exchange position to be recognized.

3. A disc changer comprising a disc conveyance mechanism for transferring the disc from a housing position of the housing portion, in which a plurality of discs are housed, to a transfer position of said housing portion through a playback portion for reproducing the disc, comprising:

an endless belt rotationally driven;

a carriage fixed to the endless belt;

a carrier engaged with an upper part of said disc to move with said carriage so that the disc is transferred; and a housing body for housing said endless belt, said carriage and said carrier;

wherein a rib protruding laterally is formed on said carriage, and a guide groove for guiding the rib is formed in the inner surface of said housing body.

4. The disc changer according to claim 3, wherein the changer is a disc changer comprising the disc conveyance mechanism in which both side faces of said carriage abut against the inner surface of said housing body.

5. The disc changer according to claim 3 or 4, wherein an opening is provided in the sidewall of said housing body and a switch is provided by protruding inward of said housing body from the opening portion, the disc changer comprises the disc conveyance mechanism in which said carriage moving on the inner surface of said housing body presses against said switch so that the position of the disc to be transferred to said carrier is detected.

6. The disc changer according to claim 5, wherein said opening portion is provided in said guide groove and said switch is provided by protruding inward of said housing body from the opening portion, the disc changer comprises the disc conveyance mechanism for detecting the position of the disc transferred to said carrier by pressing said switch against said rib of the carriage which moves along said guide groove.

7. The disc changer according to any one of claims 3, 4 and 6 wherein the disc changer comprises the disc conveyance mechanism constituted in such a manner that the mechanism comprises an arm rotatably connected to said carrier and having a pin protruding laterally and a cam groove formed in the inner surface of said housing body, wherein the pin of said arm is guided by the cam groove so that an attitude of said carrier changes so as to engage with the disc and the disc is transferred in an engaged state.

8. The disc changer according to claim 7, wherein said cam groove comprises the disc conveyance mechanism comprising a refuge portion for separating said carrier from said disc transferred to the playback portion.

9. The disc changer according to any one of claims 3–4, and 6, comprising the disc conveyance mechanism, which forms a hole on the sidewall of said carrier and comprises a positioning member having a protrusion to engage with the hole, wherein the hole of the carrier transferring said disc to said playback portion is fitted to the protrusion of said positioning member so that the disc is positioned.

10. A reproducing method of the disc, the reproducing method of the disc in the disc changer including steps of: housing a plurality of discs in a circularly formed housing portion in an upstanding state; conveying the disc selected from among all the discs housed in said housing portion to a disc gripper by the disc conveyance mechanism in a nearly vertical state; and reproducing said disc held by the disc gripper at the playback portion;

wherein said disc held by said disc gripper is rotated so as to be nearly horizontal, said disc is reproduced at said playback portion in a nearly horizontal state.

11. A reproducing method of the disc, the reproducing method of the disc in the disc changer including the steps of: housing a plurality of discs in a circularly formed housing portion in an upstanding state; conveying the disc selected from among all the discs housed in said housing portion to a disc gripper by the disc conveyance mechanism in a nearly vertical state; and reproducing said disc held by the disc gripper at the playback portion;

said disc held by said disc gripper is rotated so as to be in a reversed state, said disc is conveyed to said housing portion in a reversed state by said disc conveyance mechanism, said disc is conveyed to said disc gripper in a reversed state by said disc conveyance mechanism, said disc in a reversed state held by said disc gripper is rotated so as to be nearly horizontal, and said disc is reproduced nearly horizontally at said playback portion.

12. A disc changer, comprising: the circularly formed housing portion for housing a plurality of discs in an upstanding state; the disc conveyance mechanism for conveying the disc selected from among all the discs housed in said housing portion to the disc gripper in a nearly vertical state; and the playback portion for reproducing said disc held by said disc gripper, wherein said disc gripper has a pair of oscillatory holding portions for gripping said disc in a nearly vertical state, said disc gripper comprises a rotary mechanism for rotating said each holding portion by driving said driving portion with said each holding portion in a holding state of said disc, and said playback portion is constituted in such a manner that said disc rotated together with said each holding portion by said rotary mechanism in a nearly horizontal state is reproduced.

13. The disc changer according to claim 12, wherein said disc conveyance mechanism is capable of conveying said disc from said disc gripper to said housing portion, wherein said rotary mechanism is constituted in such a manner that said each holding portion is in a holding state of said disc and said each holding portion is nearly reversed.

14. The disc changer according to claim 12 or 13, wherein said disc changer is constituted in such a manner that said each holding portion is provided in the rotatable rotary portion, said driving portion has a driving motor and a rotary gear rotated by the drive of said motor, said rotary mechanism has a rotary guide groove formed on said rotary gear and a rotary moving member in which a rotary boss fitted to said rotary guide groove is formed and which is movably provided in said rotary portion, and when said rotary boss is positioned in a predetermined section of said rotary guide groove, said rotary portion rotates together with said rotary gear.

15. The disc changer according to claim 14, wherein an oscillation mechanism to oscillate said each holding portion by movement of said rotary moving member is provided.

16. The disc changer according to any one of claims 12 and 13, wherein said disc gripper has a holding portion for holding the outer periphery of said disc conveyed by said disc conveyance mechanism, and a holding mechanism for performing a holding and a release of the holding of said disc by the drive of said driving portion is provided.

17. The disc changer according to claim 16, wherein said holding mechanism has a guide groove for holding formed in said rotary gear and a movable moving member for holding in which a boss for holding fits into said guide groove for holding and is connected to said holding portion, said holding portion is constituted in such a manner that said holding portion performs the holding and release of the holding of said disc by the movement of said moving member for holding.

18. The disc changer according to claim 17, wherein, when said rotary gear rotates in a predetermined direction, said rotary guide groove of said rotary gear and said guide groove for holding are formed in such a manner that said disc is held by said each holding portion in a state of said disc being held by said holding portion, the holding of said disc is released in a state of said disc being held by said each holding portion, and said each holding portion is rotated, the disc is held by the holding portion in a state of the disc being in a reversed state, and said rotary guide groove of said rotary gear and said guide groove for holding are formed so that the holding of said disc is released by said each holding portion in a state of said reversed disc being held.

* * * * *